United States Patent
Bhaskara et al.

(10) Patent No.: US 12,250,454 B2
(45) Date of Patent: Mar. 11, 2025

(54) CAMERA DYNAMIC VOTING TO OPTIMIZE FAST SENSOR MODE POWER

(71) Applicant: QUALCOMM Incorporated, San Diego, CA (US)

(72) Inventors: Aravind Bhaskara, San Diego, CA (US); Tauseef Kazi, San Diego, CA (US); Zhurang Zhao, San Diego, CA (US); Rohan Desai, San Diego, CA (US); Michael Tipton, Midlothian, VA (US); Joshua Stubbs, Longmont, CO (US); Kiran Bhagwat, San Diego, CA (US); Pavan Kumar Chilamkurthi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/165,189

(22) Filed: Feb. 6, 2023

(65) Prior Publication Data
US 2024/0276096 A1  Aug. 15, 2024

(51) Int. Cl.
*H04N 23/65* (2023.01)
*H04N 25/71* (2023.01)

(52) U.S. Cl.
CPC ......... *H04N 23/651* (2023.01); *H04N 25/745* (2023.01)

(58) Field of Classification Search
CPC .... H04N 25/745; H04N 23/651; H04N 23/65; H04N 25/779
See application file for complete search history.

(56) References Cited

U.S. PATENT DOCUMENTS

| | | | | |
|---|---|---|---|---|
| 7,738,023 B2* | 6/2010 | Suzuki | ................ | H04N 23/667 348/312 |
| 9,844,312 B2* | 12/2017 | Mizuno | ................. | A61B 1/051 |
| 11,495,037 B2* | 11/2022 | Kim | ........................ | G06N 3/08 |
| 2008/0162770 A1 | 7/2008 | Titiano et al. | | |
| 2016/0062438 A1* | 3/2016 | Das | ....................... | G06F 1/3296 713/320 |
| 2017/0338661 A1* | 11/2017 | Marchya | ................... | G06F 1/26 |
| 2018/0213150 A1* | 7/2018 | Gagrani | ................ | H04N 5/907 |
| 2018/0343414 A1* | 11/2018 | Bandwar | ................ | H04N 5/772 |

(Continued)

FOREIGN PATENT DOCUMENTS

WO    2022231961 A1    11/2022

OTHER PUBLICATIONS

International Search Report and Written Opinion—PCT/US2023/083657—ISA/EPO—Apr. 9, 2024.

*Primary Examiner* — Nhan T Tran
(74) *Attorney, Agent, or Firm* — Polsinelli/Qualcomm

(57) ABSTRACT

Systems, methods, and computer-readable media are provided for camera dynamic voting to optimize fast sensor mode power. In some examples, a computing device can obtain, based on performing dynamic voting, a plurality of votes associated with a plurality of components sharing a power source. The computing device can determine a voting result based on the plurality of votes. The computing device can increase or decreasing a clock rate and a voltage for the power source based on the voting result to produce an updated clock rate and an updated voltage. The computing device can then apply the updated clock rate and the updated voltage to an image processor.

30 Claims, 15 Drawing Sheets

(56) References Cited

U.S. PATENT DOCUMENTS

| | | |
|---|---|---|
| 2022/0413593 A1 | 12/2022 | Kakkireni et al. |
| 2023/0360166 A1* | 11/2023 | Karandikar ............. G06F 1/324 |
| 2024/0196113 A1* | 6/2024 | Childs ..................... G06F 1/325 |

* cited by examiner

CAMERA DYNAMIC VOTING TO OPTIMIZE FAST SENSOR MODE POWER

FIELD

This application is related to image processing. In some examples, aspects of this application relate to systems and techniques for camera dynamic voting to optimize fast sensor mode power.

BACKGROUND

The increasing versatility of digital camera products has allowed digital cameras to be integrated into a wide array of devices and has expanded their use to different applications. For example, phones, drones, cars, computers, televisions, and many other devices today are often equipped with camera devices. The camera devices allow users to capture images and/or video (e.g., including frames of images) from any system equipped with a camera device. The images and/or videos can be captured for recreational use, professional photography, surveillance, and automation, among other applications. Moreover, camera devices are increasingly equipped with specific functionalities for modifying images or creating artistic effects on the images. For example, many camera devices are equipped with image processing capabilities for generating different effects on captured images.

For image processing, a fast sensor readout (FSR) is a common sensor operation mode used by many original equipment manufacturers (OEMs) to improve image quality (IQ) as employing FSR can result in a decrease in rolling shutter related artifacts in the images. FSR mode allows for a faster readout of image sensor data for the image frames in comparison to a normal readout mode, while maintaining the same amount of time for exposure as the normal readout mode. The faster the readout of image sensor data performed, the lower the amount of rolling shutter related artifacts that will be present in the rendered images. FSR mode can also allow for a reduction in the required sensor power (e.g., FSR mode, in some cases, can allow for a 160 to 260 milliwatt savings in sensor power in comparison to a normal readout mode). As such, employing FSR for image processing can be advantageous from both an IQ perspective and a sensor power perspective.

However, FSR mode can impact power of the chipset (e.g., which may include the image signal processor). For example, FSR mode can require the image signal processor to operate at a very high clock rate and voltage to finish the image frame processing during the condensed readout time of FSR. In addition, FSR mode can require the memory, such as double data rate (DDR) memory, to run at a high clock rate to be able to receive the fast output of data from the image sensor processor. As such, an improved technique to optimize power for FSR mode can be beneficial.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Systems and techniques are described for camera dynamic voting to optimize fast sensor mode power. According to at least one example, a method for processing image data is provided. The method includes: obtaining, based on performing dynamic voting, a plurality of votes associated with a plurality of components sharing a power source; determining a voting result based on the plurality of votes; increasing or decreasing a clock rate and a voltage for the power source based on the voting result to produce an updated clock rate and an updated voltage; and applying the updated clock rate and the updated voltage to an image processor.

In another illustrative example, an apparatus for processing image data is provided. The apparatus includes at least one memory and at least one processor coupled to the at least one memory and configured to: obtain, based on performing dynamic voting, a plurality of votes associated with a plurality of components sharing a power source; determine a voting result based on the plurality of votes; increase or decreasing a clock rate and a voltage for the power source based on the voting result to produce an updated clock rate and an updated voltage; and apply the updated clock rate and the updated voltage to an image processor.

In another illustrative example, a non-transitory computer-readable medium is provided. The computer-readable medium includes stored thereon instructions that, when executed by at least one processor, cause the at least one processor to: obtain, based on performing dynamic voting, a plurality of votes associated with a plurality of components sharing a power source; determine a voting result based on the plurality of votes; increase or decreasing a clock rate and a voltage for the power source based on the voting result to produce an updated clock rate and an updated voltage; and apply the updated clock rate and the updated voltage to an image processor.

In another illustrative example, an apparatus for processing image data is provided. The apparatus includes: means for obtaining, based on performing dynamic voting, a plurality of votes associated with a plurality of components sharing a power source; means for determining a voting result based on the plurality of votes; means for increasing or decreasing a clock rate and a voltage for the power source based on the voting result to produce an updated clock rate and an updated voltage; and means for applying the updated clock rate and the updated voltage to an image processor.

Aspects generally include a method, apparatus, system, computer program product, non-transitory computer-readable medium, user device, user equipment, wireless communication device, and/or processing system as substantially described with reference to and as illustrated by the drawings and specification.

In some aspects, each of the apparatuses described above is, can be part of, or can include a mobile device, a smart or connected device, a camera system, and/or an extended reality (XR) device (e.g., a virtual reality (VR) device, an augmented reality (AR) device, or a mixed reality (MR) device). In some examples, the apparatuses can include or be part of a vehicle, a mobile device (e.g., a mobile telephone or so-called "smart phone" or other mobile device), a wearable device, a personal computer, a laptop computer, a tablet computer, a server computer, a robotics device or system, an aviation system, or other device. In some aspects, the apparatus includes an image sensor (e.g., a camera) or multiple image sensors (e.g., multiple cameras) for capturing one or more images. In some aspects, the apparatus includes one or more displays for displaying one or more images, notifications, and/or other displayable data. In some aspects, the apparatus includes one or more speakers, one or more light-emitting devices, and/or one or more microphones. In some aspects, the apparatuses described above can include one or more sensors. In some cases, the one or more sensors can be used for determining a location of the apparatuses, a state of the apparatuses (e.g., a tracking state, an operating state, a temperature, a humidity level, and/or other state), and/or for other purposes.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The preceding, together with other features and embodiments, will become more apparent upon referring to the following specification, claims, and accompanying drawings.

BRIEF DESCRIPTION OF THE DRAWINGS

Examples of various implementations are described in detail below with reference to the following figures.

DETAILED DESCRIPTION

Figure 1:
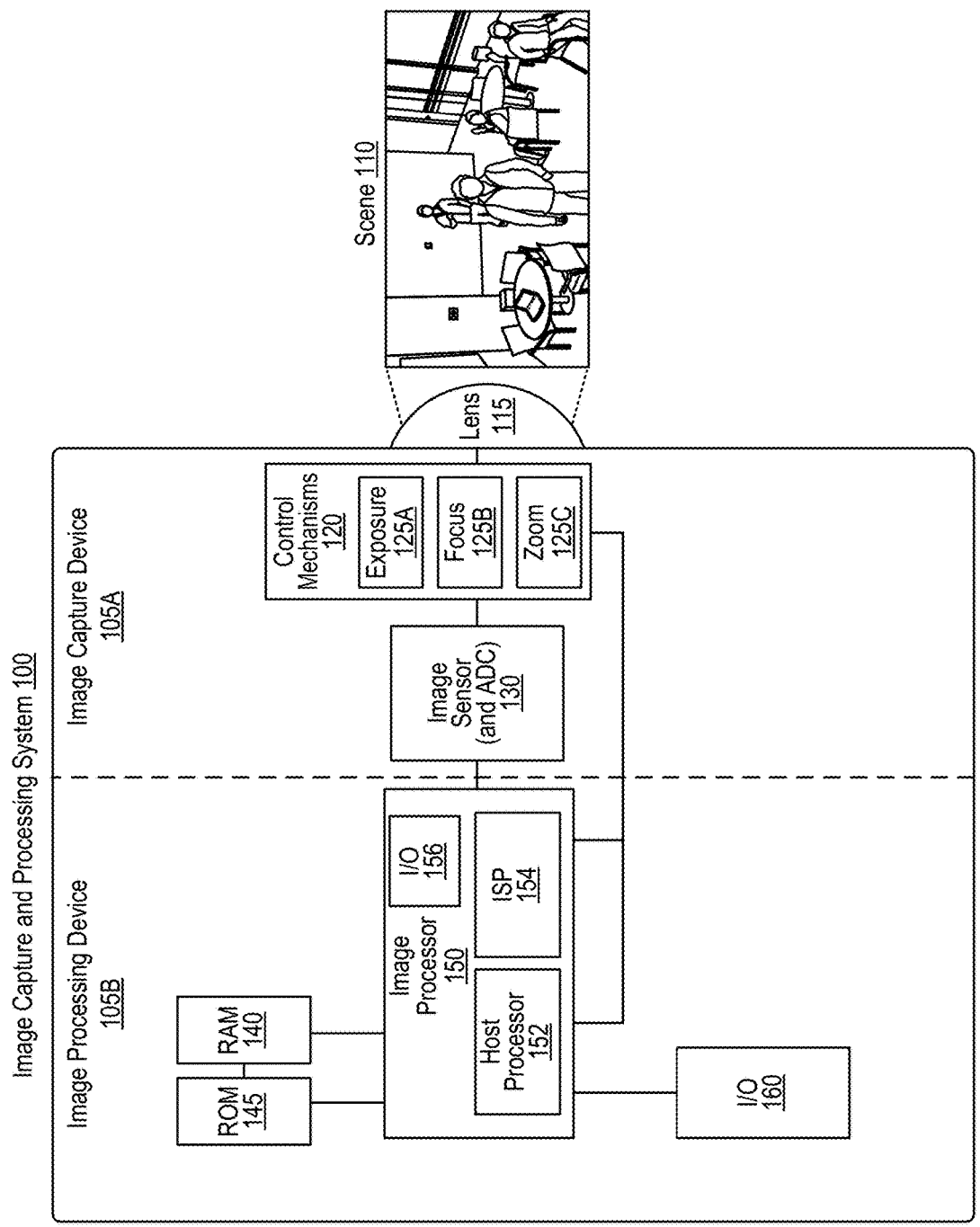
FIG. 1 is a block diagram illustrating an example architecture of an image capture and processing system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

A camera is a device that receives light and captures image frames, such as still images or video frames, using an image sensor. The terms "image," "image frame," and "frame" are used interchangeably herein. Cameras may include processors, such as image signal processors (ISPs), that can receive one or more image frames and process the one or more image frames. For example, a raw image frame captured by a camera sensor can be processed by an ISP to generate a final image. Processing by the ISP can be performed by a plurality of filters or processing blocks being applied to the captured image frame, such as denoising or noise filtering, edge enhancement, color balancing, contrast, intensity adjustment (such as darkening or lightening), tone adjustment, among others. Image processing blocks or modules may include lens/sensor noise correction, Bayer filters, de-mosaicing, color conversion, correction or enhancement/suppression of image attributes, denoising filters, sharpening filters, among others.

Cameras can be configured with a variety of image capture and image processing operations and settings. The different settings result in images with different appearances. Some camera operations are determined and applied before or during capture of the image, such as automatic exposure control (AEC) and automatic white balance (AWB) processing. Additional camera operations applied before, during, or after capture of an image include operations involving zoom (e.g., zooming in or out), ISO, aperture size, f/stop, shutter speed, and gain. Other camera operations can configure post-processing of an image, such as alterations to contrast, brightness, saturation, sharpness, levels, curves, or colors.

As previously mentioned, for image processing, FSR is a common sensor operation mode used by many OEMs to improve IQ because employing FSR can result in a decrease in rolling shutter related artifacts in the images. FSR mode allows for a faster readout of image sensor data for the image frames in comparison to a normal readout mode, while maintaining the same amount of exposure time as the normal readout mode. The faster the readout of image sensor data performed, the lower the amount of rolling shutter related artifacts that will be present in the rendered images. FSR mode can additionally allow for a reduction in the required sensor power (e.g., FSR mode, in some cases, can allow for a 160 to 260 milliwatt savings in sensor power in comparison to a normal readout mode). As such, utilizing FSR mode for image processing can be beneficial from an IQ perspective as well as a sensor power perspective.

However, FSR mode can impact power of the chipset, which may include the image signal processor (ISP). For example, FSR mode can require the ISP to operate at a very high clock rate and voltage to finish the image frame processing during the condensed readout time of FSR mode. In addition, FSR mode can require the memory (e.g., DDR memory) to run at a high clock rate to be able to receive the fast output of data from the image sensor processor. As such, an improved technique to optimize power for FSR mode can be useful.

Accordingly, systems, apparatuses, processes (also referred to as methods), and computer-readable media (collectively referred to herein as "systems and techniques") are described herein for camera dynamic voting to optimize fast sensor mode power (e.g., FSR mode power). For instance, in some examples, the systems and techniques can optimize the camera chipset, such as a system on a chip (SOC), power overhead incurred during operation of the camera in FSR mode. With conventional static clocking mechanisms, the ISP and DDR memory have a clock rate at a fixed frequency to meet the use case instantaneous performance requirements, which can result in requiring a significant power overhead throughout the use case timeline.

In one or more aspects, the systems and techniques dynamically increase the ISP and DDR clock rate during a short sensor readout duration of the use case timeline, and lower the ISP and DDR clock rate immediately after the short sensor readout duration has completed (e.g., such that the clock rate is low during a large blanking interval, in the use case timeline, where no sensor readout is being performed). In adjusting the clock rate as such, the large power overhead requirement can be limited to only the sensor readout portions of the use case timeline (e.g., which is typically only 25 to 50 percent of the use case timeline).

Most camera use cases operate at a specified image frame rate configured by high level application software (SW). The systems and techniques can employ a configurable hardware (HW) timer mechanism (e.g., dynamic clock voting engine 1250 of FIG. 12) to trigger a dynamic increase in the clock rate immediately prior to receiving a new image frame from the image sensor, and a dynamic decrease in the clock rate and shared rail voltage right after processing of the image frame has been completed.

Further aspects of the systems and techniques are described with respect to the figures.

FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo, thereby adjusting focus. In some cases, additional lenses may be included in the device 105A, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 1510 discussed with respect to the computing system 1500. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface), an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1525, read-only memory (ROM) 145/1520, a cache 1512, a memory unit 1515, another storage device 1530, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1535, any other input devices 1545, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the device 105B and one or more peripheral devices, over which the device 105B may receive data from the one or more peripheral device and/or transmit data to the one or more peripheral devices. The I/O 160 may include one or more wireless transceivers that enable a wireless connection between the device 105B and one or more peripheral devices, over which the device 105B may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

The host processor 152 can configure the image sensor 130 with new parameter settings (e.g., via an external control interface such as I2C, I3C, SPI, GPIO, and/or other interface). In one illustrative example, the host processor 152 can update exposure settings used by the image sensor 130 based on internal processing results of an exposure control algorithm from past image frames.

In some examples, the host processor 152 can perform electronic image stabilization (EIS). For instance, the host processor 152 can determine a motion vector corresponding to motion compensation for one or more image frames. In some aspects, host processor 152 can position a cropped pixel array ("the image window") within the total array of pixels. The image window can include the pixels that are used to capture images. In some examples, the image window can include all of the pixels in the sensor, except for a portion of the rows and columns at the periphery of the sensor. In some cases, the image window can be in the center of the sensor while the image capture device 105A is stationary. In some aspects, the peripheral pixels can surround the pixels of the image window and form a set of buffer pixel rows and buffer pixel columns around the image window. Host processor 152 can implement EIS and shift the image window from frame to frame of video, so that the image window tracks the same scene over successive frames (e.g., assuming that the subject does not move). In some examples in which the subject moves, host processor 152 can determine that the scene has changed.

In some examples, the image window can include at least 95% (e.g., 95% to 99%) of the pixels on the sensor. The first region of interest (ROI) (e.g., used for AE and/or AWB) may include the image data within the field of view of at least 95% (e.g., 95% to 99%) of the plurality of imaging pixels in the image sensor 130 of the image capture device 105A. In some aspects, a number of buffer pixels at the periphery of the sensor (outside of the image window) can be reserved as a buffer to allow the image window to shift to compensate for jitter. In some cases, the image window can be moved so that the subject remains at the same location within the adjusted image window, even though light from the subject may impinge on a different region of the sensor. In another example, the buffer pixels can include the ten topmost rows, ten bottommost rows, ten leftmost columns and ten rightmost columns of pixels on the sensor. In some configurations, the buffer pixels are not used for AF, AE or AWB when the image capture device 105A is stationary and the buffer pixels not included in the image output. If jitter moves the sensor to the left by twice the width of a column of pixels between frames, the EIS algorithm can be used to shift the image window to the right by two columns of pixels, so the captured image shows the same scene in the next frame as in the current frame. Host processor 152 can use EIS to smoothen the transition from one frame to the next.

In some aspects, the host processor 152 can also dynamically configure the parameter settings of the internal pipelines or modules of the ISP 154 to match the settings of one or more input image frames from the image sensor 130 so that the image data is correctly processed by the ISP 154. Processing (or pipeline) blocks or modules of the ISP 154 can include modules for lens/sensor noise correction, demosaicing, color conversion, correction or enhancement/suppression of image attributes, denoising filters, sharpening filters, among others. The settings of different modules of the ISP 154 can be configured by the host processor 152. Each module may include a large number of tunable parameter settings. Additionally, modules may be co-dependent as different modules may affect similar aspects of an image. For example, denoising and texture correction or enhancement may both affect high frequency aspects of an image. As a result, a large number of parameters are used by an ISP to generate a final image from a captured raw image.

In some cases, the image capture and processing system 100 may perform one or more of the image processing functionalities described above automatically. For instance, one or more of the control mechanisms 120 may be configured to perform auto-focus operations, auto-exposure operations, and/or auto-white-balance operations. In some embodiments, an auto-focus functionality allows the image capture device 105A to focus automatically prior to capturing the desired image. Various auto-focus technologies exist. For instance, active autofocus technologies determine a range between a camera and a subject of the image via a range sensor of the camera, typically by emitting infrared lasers or ultrasound signals and receiving reflections of those signals. In addition, passive auto-focus technologies use a camera's own image sensor to focus the camera, and thus do not require additional sensors to be integrated into the camera. Passive AF techniques include Contrast Detection Auto Focus (CDAF), Phase Detection Auto Focus (PDAF), and in some cases hybrid systems that use both. The image capture and processing system 100 may be equipped with these or any additional type of auto-focus technology.

Figure 2:
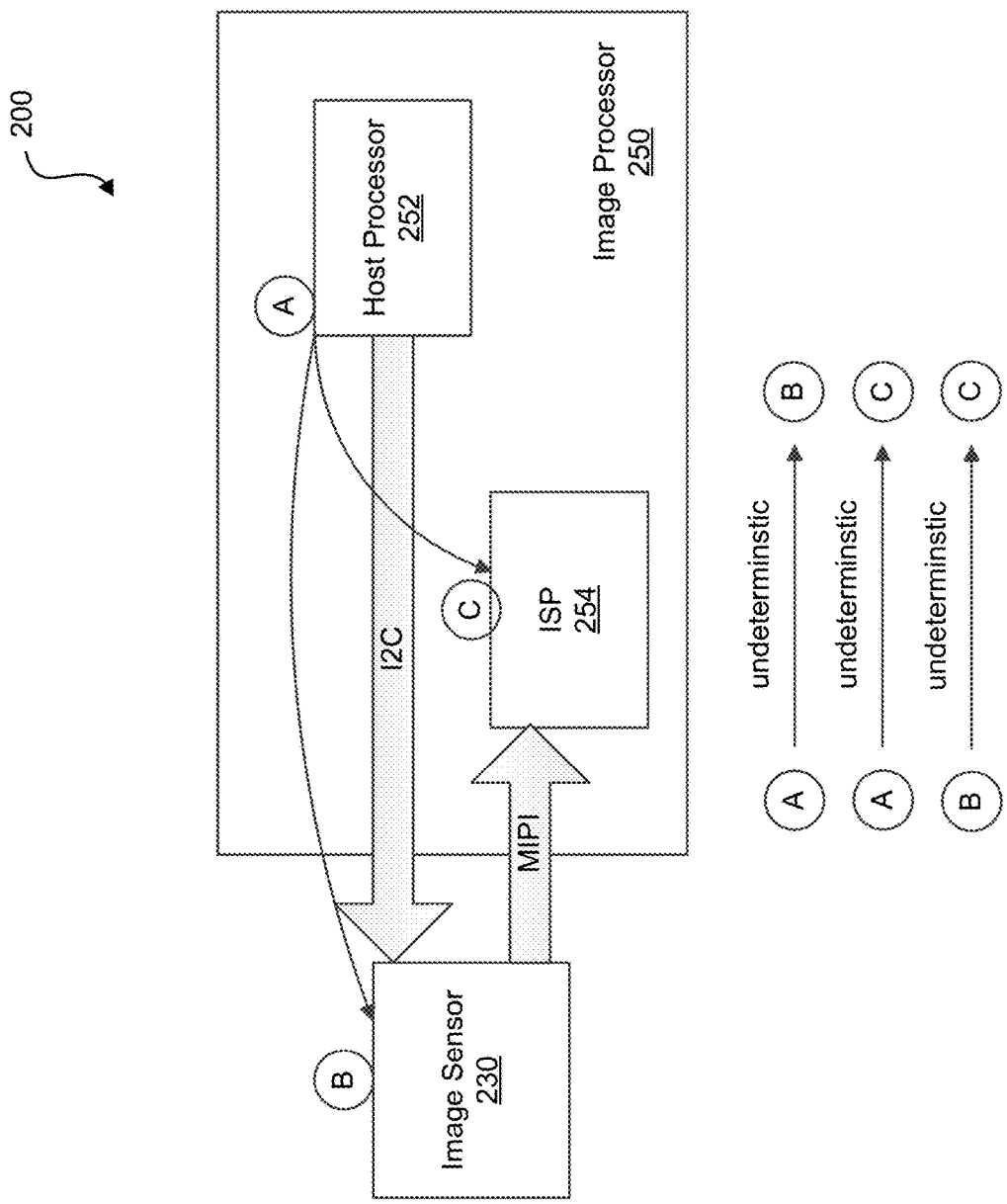
FIG. 2 is a block diagram illustrating an example of interactions between components of an image capture and processing system, in accordance with some examples.

Synchronization between the image sensor 130 and the ISP 154 is important in order to provide an operational image capture system that generates high quality images without interruption and/or failure. FIG. 2 is a block diagram illustrating an example of an image capture and processing system 200 including an image processor 250 (including host processor 252 and ISP 254) in communication with an image sensor 230. The configuration shown in FIG. 2 is illustrative of traditional synchronization techniques used in camera systems. In general, the host processor 252 attempts to provide synchronization between the image sensor 230 and the ISP 254 using fixed periods of time by separately communicating with the image sensor 230 and the ISP 254. For example, in traditional camera systems, the host processor 252 communicates with the image sensor 230 (e.g., over an I2C port) and programs the image sensor 230 parameters with a first fixed period of time, such as 2-frame periods ahead of when that image frame will be processed by the ISP 254. The host processor 252 communicates with the ISP 254 (e.g., over an internal AHB bus or other interface) and programs the ISP 254 parameter settings with a second fixed period of time, such as 1-frame period ahead of when that image frame will be processed by the ISP 254.

The image sensor 230 can send image frames to the ISP 254 (B-to-C in FIG. 2), such as over an MIPI CSI-2 PHY port or interface, or other suitable interface. However, the communication between the host processor 252 and the image sensor 230 (shown as from A to B) is undeterministic. Similarly, the communication between the image sensor 230 and the ISP 254 (shown as from B to C) and the communication the host processor 252 and the ISP 254 (shown as from A to C) are also undeterministic. For example, there can be varying latencies in programming of the image sensor 230 and the ISP 254 by the host processor 252, which can result in a parameter settings mismatch between the sensor and the ISP. The latencies can be due to high CPU usage, congestion in one or more I/O ports, and/or due to other factors.

Figure 3:
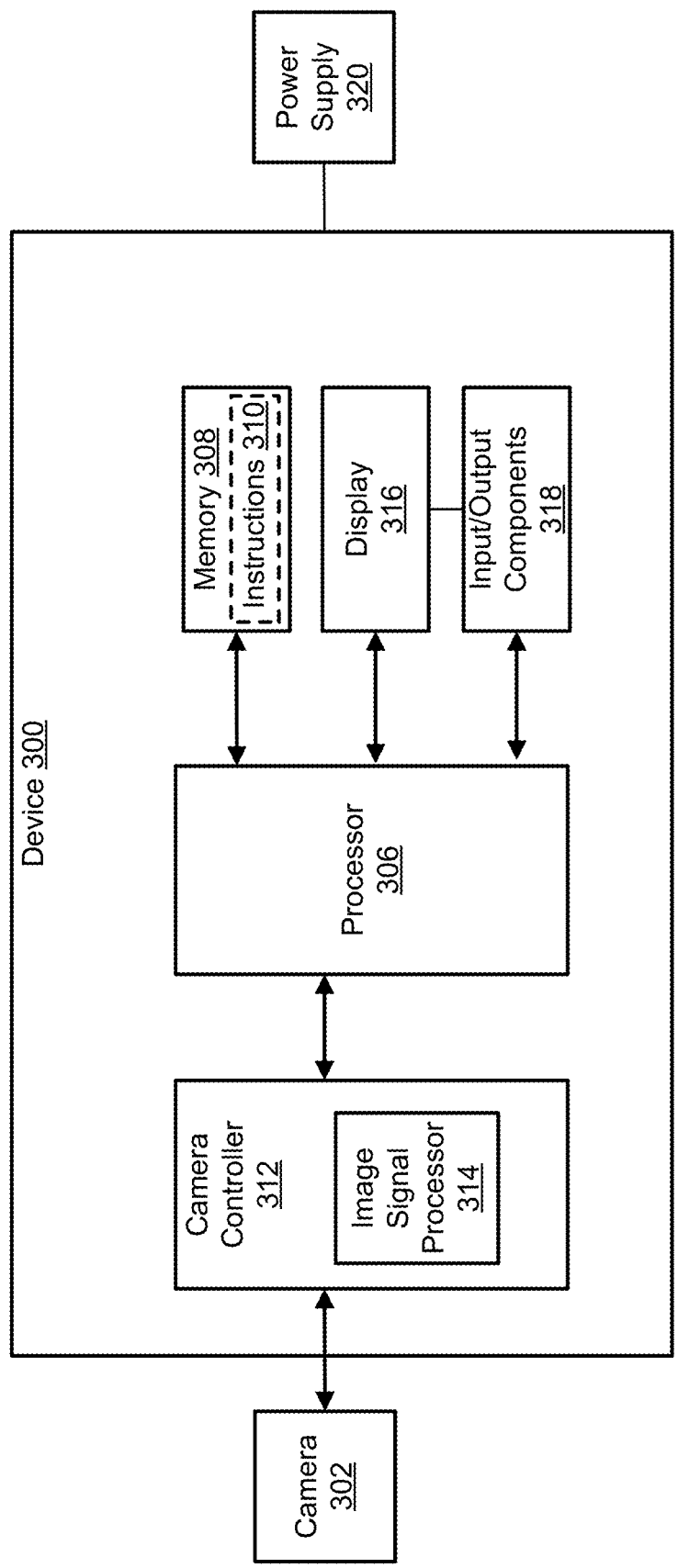
FIG. 3 is a block diagram of an example device that may be used for camera dynamic voting to optimize fast sensor mode power, in accordance with some examples.

FIG. 3 is a block diagram of an example device 300 that may be used for camera dynamic voting to optimize fast sensor mode power. Device 300 may include or may be coupled to a camera 302, and may further include a processor 306, a memory 308 storing instructions 310, a camera controller 312, a display 316, and a number of input/output (I/O) components 318 including one or more microphones (not shown). The example device 300 may be any suitable device capable of capturing and/or storing images or video including, for example, wired and wireless communication devices (such as camera phones, smartphones, tablets, security systems, smart home devices, connected home devices, surveillance devices, internet protocol (IP) devices, dash cameras, laptop computers, desktop computers, automobiles, drones, aircraft, and so on), digital cameras (including still cameras, video cameras, and so on), or any other suitable device. The device 300 may include additional features or components not shown. For example, a wireless interface, which may include a number of transceivers and a baseband processor, may be included for a wireless communication device. Device 300 may include or may be coupled to additional cameras other than the camera 302. The disclosure should not be limited to any specific examples or illustrations, including the example device 300.

Camera 302 may be capable of capturing individual image frames (such as still images) and/or capturing video (such as a succession of captured image frames). Camera 302 may include one or more image sensors (not shown for simplicity) and shutters for capturing an image frame and providing the captured image frame to camera controller 312. Although a single camera 302 is shown, any number of cameras or camera components may be included and/or coupled to device 300. For example, the number of cameras may be increased to achieve greater depth determining capabilities or better resolution for a given FOV.

Memory 308 may be a non-transient or non-transitory computer readable medium storing computer-executable instructions 310 to perform all or a portion of one or more operations described in this disclosure. Device 300 may also include a power supply 320, which may be coupled to or integrated into the device 300.

Processor 306 may be one or more suitable processors capable of executing scripts or instructions of one or more software programs (such as the instructions 310) stored within memory 308. In some aspects, processor 306 may be one or more general purpose processors that execute instructions 310 to cause device 300 to perform any number of functions or operations. In additional or alternative aspects, processor 306 may include integrated circuits or other hardware to perform functions or operations without the use of software. While shown to be coupled to each other via processor 306 in the example of FIG. 3, processor 306, memory 308, camera controller 312, display 316, and I/O components 318 may be coupled to one another in various arrangements. For example, processor 306, memory 308, camera controller 312, display 316, and/or I/O components 318 may be coupled to each other via one or more local buses (not shown for simplicity).

Display 316 may be any suitable display or screen allowing for user interaction and/or to present items (such as captured images and/or videos) for viewing by the user. In some aspects, display 316 may be a touch-sensitive display. Display 316 may be part of or external to device 300.

Display 316 may comprise an LCD, LED, OLED, or similar display. I/O components 318 may be or may include any suitable mechanism or interface to receive input (such as commands) from the user and/or to provide output to the user. For example, I/O components 318 may include (but are not limited to) a graphical user interface, keyboard, mouse, microphone and speakers, and so on.

Camera controller 312 may include an image signal processor (ISP) 314, which may be (or may include) one or more image signal processors to process captured image frames or videos provided by camera 302. For example, ISP 314 may be configured to perform various processing operations for automatic focus (AF), automatic white balance (AWB), and/or automatic exposure (AE), which may also be referred to as automatic exposure control (AEC). Examples of image processing operations include, but are not limited to, cropping, scaling (e.g., to a different resolution), image stitching, image format conversion, color interpolation, image interpolation, color processing, image filtering (e.g., spatial image filtering), and/or the like.

In some example implementations, camera controller 312 (such as the ISP 314) may implement various functionality, including imaging processing and/or control operation of camera 302. In some aspects, ISP 314 may execute instructions from a memory (such as instructions 310 stored in memory 308 or instructions stored in a separate memory coupled to ISP 314) to control image processing and/or operation of camera 302. In other aspects, ISP 314 may include specific hardware to control image processing and/or operation of camera 302. ISP 314 may alternatively or additionally include a combination of specific hardware and the ability to execute software instructions.

While not shown in FIG. 3, in some implementations, ISP 314 and/or camera controller 312 may include an AF module, an AWB module, and/or an AE module. ISP 314 and/or camera controller 312 may be configured to execute an AF process, an AWB process, and/or an AE process. In some examples, ISP 314 and/or camera controller 312 may include hardware-specific circuits (e.g., an application-specific integrated circuit (ASIC)) configured to perform the AF, AWB, and/or AE processes. In other examples, ISP 314 and/or camera controller 312 may be configured to execute software and/or firmware to perform the AF, AWB, and/or AE processes. When configured in software, code for the AF, AWB, and/or AE processes may be stored in memory (such as instructions 310 stored in memory 308 or instructions stored in a separate memory coupled to ISP 314 and/or camera controller 312). In other examples, ISP 314 and/or camera controller 312 may perform the AF, AWB, and/or AE processes using a combination of hardware, firmware, and/or software. When configured as software, AF, AWB, and/or AE processes may include instructions that configure ISP 314 and/or camera controller 312 to perform various image processing and device managements tasks, including the techniques of this disclosure.

Figure 4:
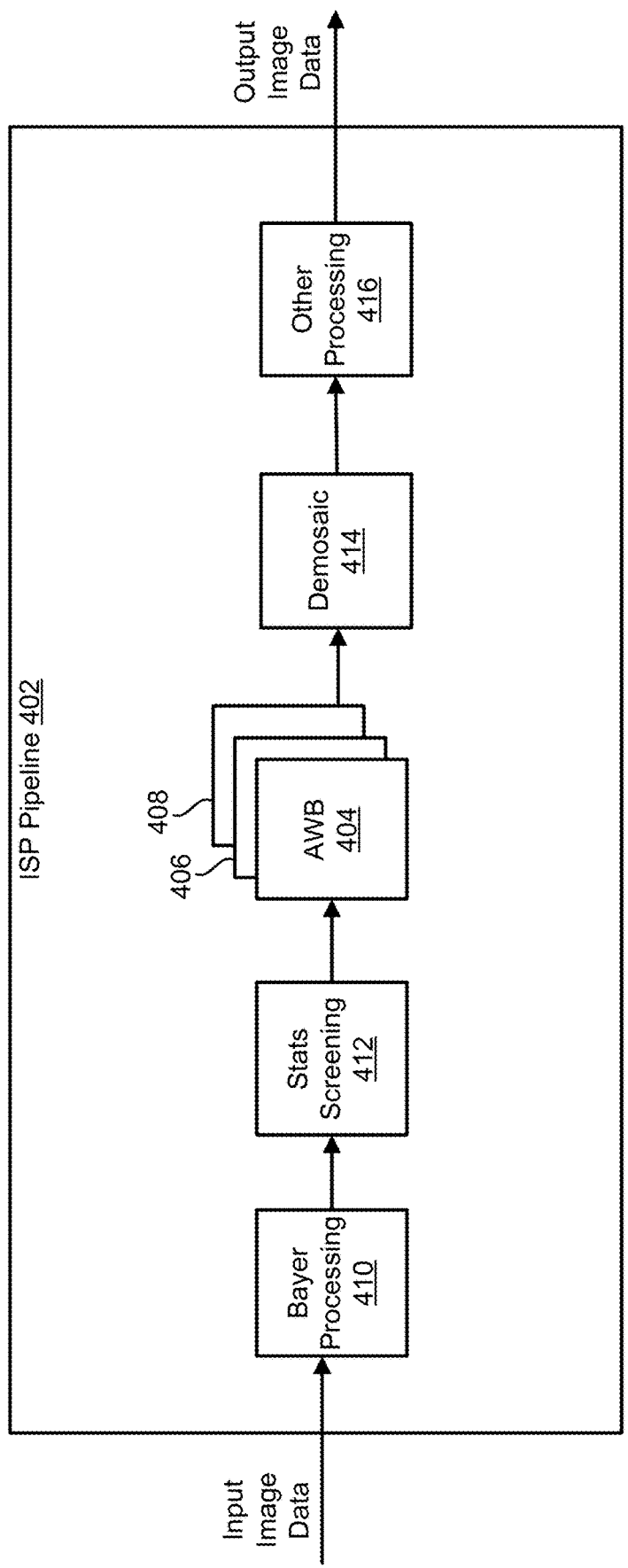
FIG. 4 is a block diagram showing the operation of an image signal processor pipeline, in accordance with some examples.

FIG. 4 is a block diagram showing the operation of an image signal processing pipeline 402 of an image signal processor (e.g., the ISP 314). For example, the ISP 314 may be configured to execute the image signal processing pipeline 402 to process input image data. The ISP 314 may receive the input image data from camera 302 of FIG. 3 and/or an image sensor (not shown) of camera 302. In some examples, such as shown in FIG. 4, the input image data may include color data of the image/frame and/or any other data (e.g., depth data). In the example of FIG. 4, the color data received for the input image data may be in a Bayer format. Rather than capturing red (R), green (G), and blue (B) values for each pixel of an image, image sensors (e.g., an image sensor of camera 302) may use a Bayer filter mosaic (or more generally, a color filter array (CFA)), where each photosensor of a digital image sensor captures a different one of the RGB colors. One example of a filter pattern for a Bayer filter mosaic may include 50% green filters, 25% red filters, and 25% blue filters.

Bayer processing unit 410 may perform one or more initial processing techniques on the raw Bayer data received by ISP 314, including, for example, subtraction, rolloff correction, bad pixel correction, black level compensation, and/or denoising.

Stats screening process 412 may determine Bayer grade or Bayer grid (BG) statistics of the received input image data. In some examples, BG statistics may include a red color to green color ratio (R/G) (which may indicate whether a red tinting exists and the magnitude of the red tinting that may exist in an image) and/or a blue color to green color ratio (B/G) (which may indicate whether a blue tinting exists and the magnitude of the blue tinting that may exist in an image). For example, the (R/G) for an image or a portion/region of an image may be depicted by equation (1) below:

$$R/G = \frac{\sum_{n=1}^{N} \text{Red}(n)}{\sum_{n=1}^{N} \text{Green}(n)} \quad (1)$$

where the image or a portion/region of the image includes pixels 1-N, each pixel n includes a red value Red(n), a blue value Blue(n), or a green value Green(n) in an RGB space. The (R/G) is the sum of the red values for the red pixels in the image divided by the sum of the green values for the green pixels in the image. Similarly, the (B/G) for the image or a portion/region of the image may be depicted by equation (2) below:

$$B/G = \frac{\sum_{n=1}^{N} \text{Blue}(n)}{\sum_{n=1}^{N} \text{Green}(n)} \quad (2)$$

In some other example implementations, a different color space may be used, such as Y'UV, with chrominance values UV indicating the color, and/or other indications of a tinting or other color temperature effect for an image may be determined.

AWB module and/or process 404 may analyze information relating to the received image data to determine an illuminant of the scene, from among a plurality of possible illuminants, and may determine an AWB gain to apply to the received image and/or a subsequent image based on the determined illuminant. White balance is a process used to try to match colors of an image with a user's perceptual experience of the object being captured.

As an example, the white balance process may be designed to make white objects actually appear white in the processed image and gray objects actually appear gray in the processed image.

An illuminant may include a lighting condition, a type of light, etc. of the scene being captured. In some examples, a user of an image capture device (e.g., such as device 300 of FIG. 3) may select or indicate an illuminant under which an image was captured. In other examples, the image capture device itself may automatically determine the most likely illuminant and perform white balancing based on the determined illuminant (e.g., lighting condition). In order to better render the colors of a scene in a captured image or video, an AWB algorithm on a device and/or camera may attempt to determine the illuminants of the scene and set/adjust the white balance of the image or video accordingly.

Device 300, during the AWB process 404, may determine or estimate a color temperature for a received frame (e.g., image). The color temperature may indicate a dominant color tone for the image. The true color temperature for a scene being captured in a video or image is the color of the light sources for the scene. If the light is radiation emitted from a perfect blackbody radiator (theoretically ideal for all electromagnetic wavelengths) at a particular color temperature (represented in Kelvin (K)), and the color temperatures are known, then the color temperature for the scene is known. For example, in a Commission Internationale de l'éclairage (CIE) defined color space (from 1931), the chromaticity of radiation from a blackbody radiator with temperatures from 1,000 to 20,000 K is the Planckian locus. Colors on the Planckian locus from approximately 2,000 K to 20,000 K are considered white, with 2,000 K being a warm or reddish white and 20,000 K being a cool or bluish white. Many incandescent light sources include a Planckian radiator (tungsten wire or another filament to glow) that emits a warm white light with a color temperature of approximately 2,400 to 3,100 K.

However, other light sources, such as fluorescent lights, discharge lamps, or light emitting diodes (LEDs), are not perfect blackbody radiators whose radiation falls along the Planckian locus. For example, an LED or a neon sign emit light through electroluminescence, and the color of the light does not follow the Planckian locus. The color temperature determined for such light sources may be a correlated color temperature (CCT). The CCT is the estimated color temperature for light sources whose colors do not fall exactly on the Planckian locus. For example, the CCT of a light source is the blackbody color temperature that is closest to the radiation of the light source. CCT may also be denoted in K.

CCT may be an approximation of the true color temperature for the scene. For example, the CCT may be a simplified color metric of chromaticity coordinates in the CIE 1931 color space. Many devices may use AWB to estimate a CCT for color balancing.

The CCT may be a temperature rating from warm colors (such as yellows and reds below 3200 K) to cool colors (such as blue above 4000 K). The CCT (or other color temperature) may indicate the tinting that will appear in an image captured using such light sources. For example, a CCT of 2700 K may indicate a red tinting, and a CCT of 5000 K may indicate a blue tinting.

Different lighting sources or ambient lighting may illuminate a scene, and the color temperatures may be unknown to the device. As a result, the device may analyze data captured by the image sensor to estimate a color temperature for an image (e.g., a frame). For example, the color temperature may be an estimation of the overall CCT of the light sources for the scene in the image. The data captured by the image sensor used to estimate the color temperature for a frame (e.g., image) may be the captured image itself.

After device 300 determines a color temperature for the scene (such as during performance of AWB), device 300 may use the color temperature to determine a color balance for correcting any tinting in the image. For example, if the color temperature indicates that an image includes a red tinting, device 300 may decrease the red value or increase the blue value for each pixel of the image, e.g., in an RGB space. The color balance may be the color correction (such as the values to reduce the red values or increase the blue values).

Example inputs to AWB process 404 may include the Bayer grade or Bayer grid (BG) statistics of the received image data determined via stats screening process 412, an exposure index (e.g., the brightness of the scene of the received image data), and auxiliary information, which may include the contextual information of the scene based on the audio input (as will be discussed in further detail below), depth information, etc. It should be noted that AWB process 404 may be included within camera controller 312 of FIG. 3 as a separate AWB module.

AE process 406 may include instructions for configuring, calculating, and/or storing an exposure setting of camera 302 of FIG. 3. An exposure setting may include an amount of sensor gain to be applied, an amount of digital gain to be applied, shutter speed and/or exposure time, an aperture setting, and/or an ISO setting to use to capture subsequent images. AE process 406 may use the audio input and/or the contextual information of the scene based on the audio input to determine and/or apply exposure settings faster. It should be noted that AE process 406 may be included within camera controller 312 of FIG. 3 as a separate AE module.

AF process 408 may include instructions for configuring, calculating and/or storing an auto focus setting of camera 302 of FIG. 3. AF process 408 may determine the auto focus setting (e.g., an initial lens position, a final lens position, etc.) based on the audio input and/or the contextual information of the scene based on the audio input. It should be noted that AF process 408 may be included within camera controller 312 of FIG. 3 as a separate AF module.

Demosaic processing unit 414 may be configured to convert the processed Bayer image data into RGB values for each pixel of an image. As explained above, Bayer data may only include values for one color channel (R, G, or B) for each pixel of the image. Demosaic processing unit 414 may determine values for the other color channels of a pixel by interpolating from color channel values of nearby pixels. In some ISP pipelines 402, demosaic processing unit 414 may come before AWB, AE, and/or AF processes 404, 406, 408 or after AWB, AE, and/or AF processes 404, 406, 408.

Other processing unit 416 may apply additional processing to the image after AWB, AE, and/or AF processes 404, 406, 408 and/or demosaic processing unit 414. The additional processing may include color, tone, and/or spatial processing of the image.

As previously mentioned, for image processing, FSR is a common sensor operation mode used by many OEMs to improve IQ as employing FSR can result in a decrease in rolling shutter related artifacts in the images. FSR mode can allow for a faster readout of image sensor data for the image frames in comparison to a normal readout mode, while maintaining the same amount of exposure time as the normal readout mode. The faster the readout of image sensor data performed, the lower the number of rolling shutter related artifacts that will be present in the rendered images.

Figure 5:
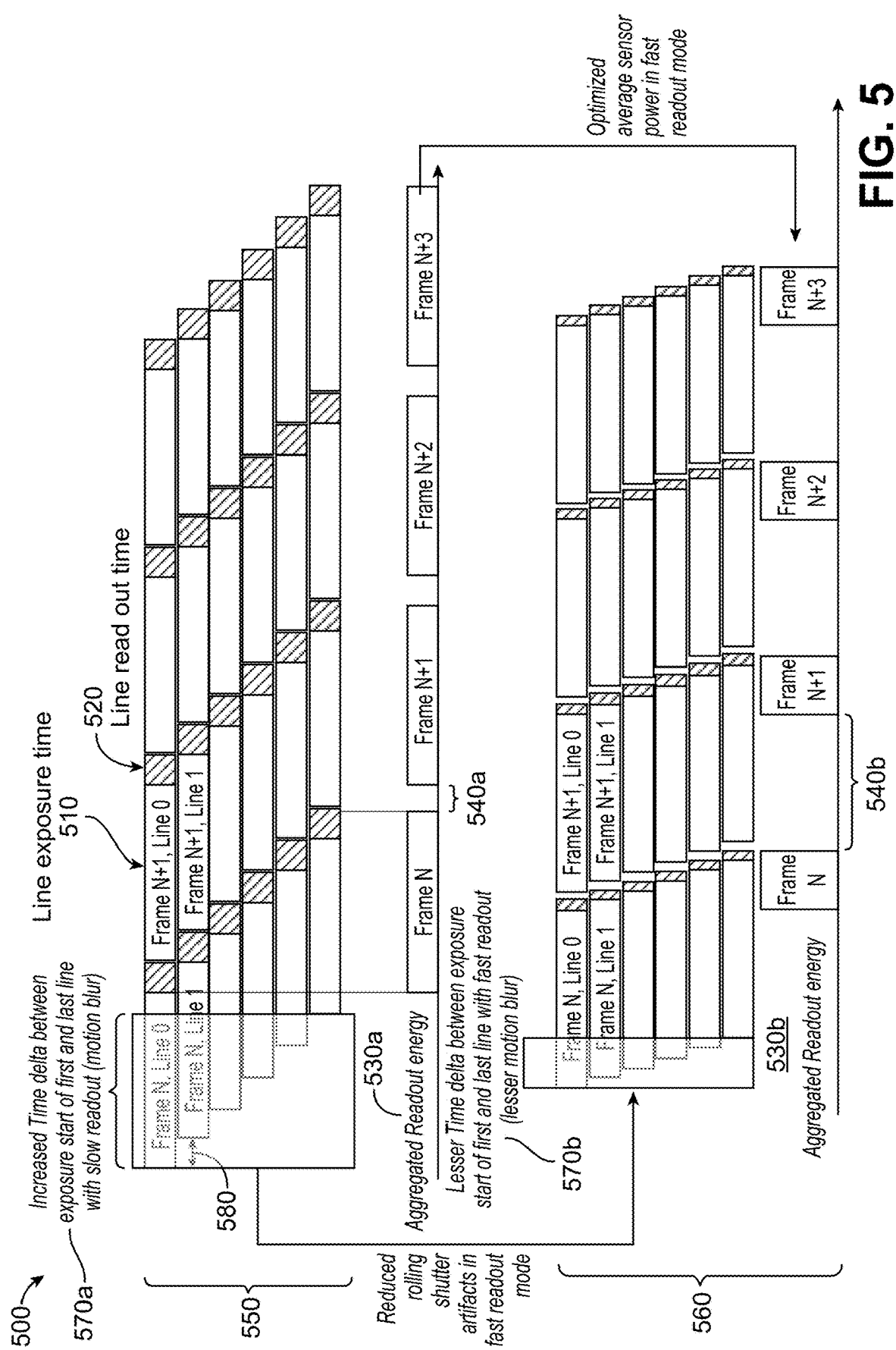
FIG. 5 is a diagram illustrating an example of camera sensor timing, in accordance with some examples.

FIG. 5 is a diagram comparing timing of FSR mode to timing of a normal readout mode. In particular, FIG. 5 is a diagram illustrating an example of camera sensor timing 500. In FIG. 5, a FSR mode timing diagram 560 is compared with a normal readout mode timing diagram 550.

Figure 12:
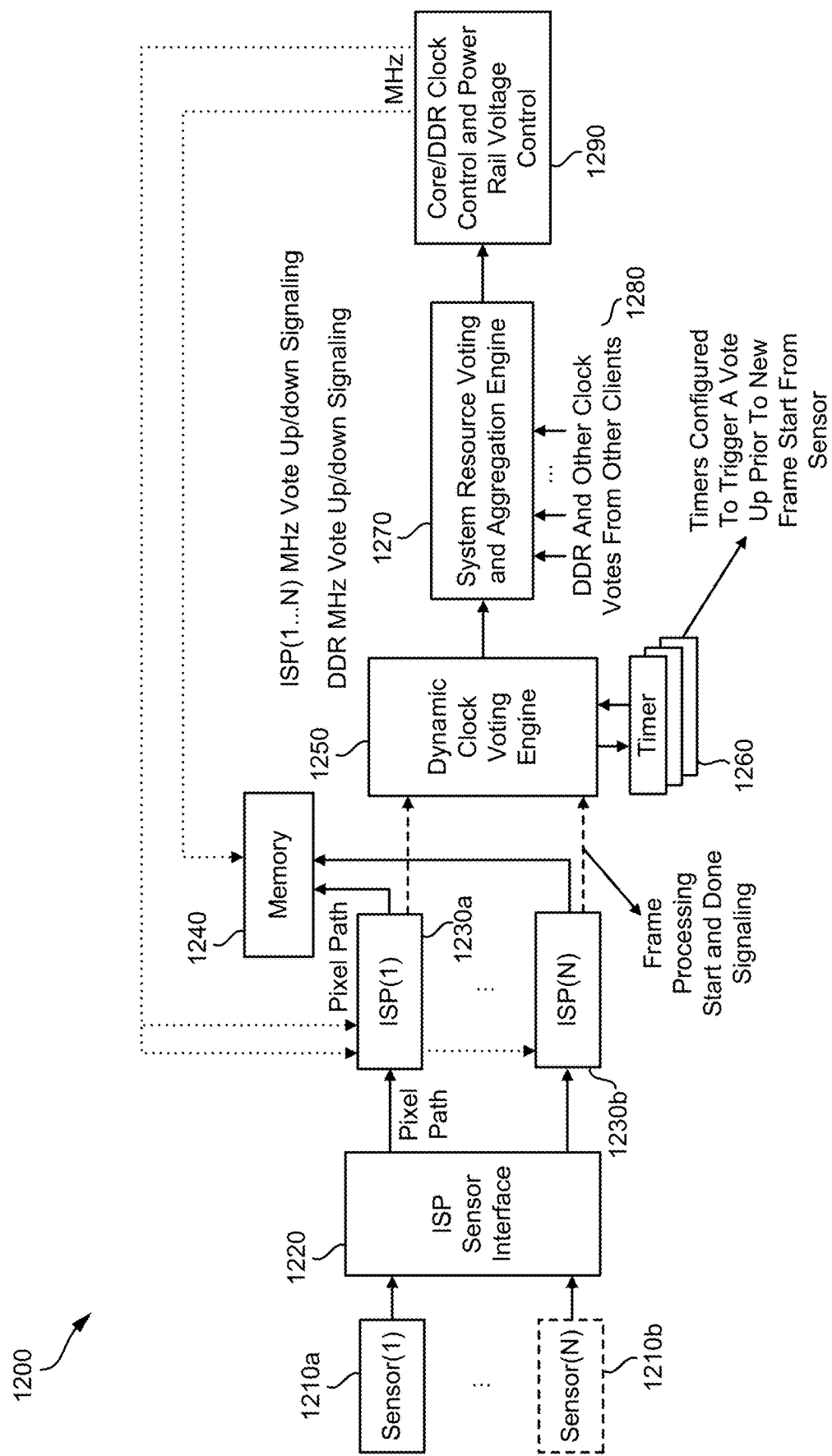
FIG. 12 is a diagram illustrating an example of system employing a dynamic voting mechanism to optimize fast sensor mode power, in accordance with some examples.

In FIG. 5, the normal readout mode timing diagram 550 shows the amount of time the line is exposed (e.g., time period 510), and the amount of time the line is read out (e.g., time period 520) from one or more camera sensors (e.g., sensor 1210*a* through 1210*b* of FIG. 12) to the camera SOC, which can include one or more ISPs (e.g., ISP 1230*a* through 1230*b* of FIG. 12).

As shown in FIG. 5, the lines are exposed one at a time (e.g., time period 510). In the normal readout timing diagram 550, in the first row, the first line is exposed and, then, the first line is read out. The second line is exposed with some delay after the exposure start of the first line (e.g., time period 510) and, then, the second line is read out (e.g., time period 520). The read out of the second line may start immediately after the read out of the first line is completed.

For both the normal readout timing diagram 550 and the FSR mode timing diagram 560, the same amount of exposure time for all the lines should be maintained in the whole image frame. This exposure time occurs only at one line at a time. It is desirable to maintain the same exposure time for each line, otherwise there can be an inconsistent pixel dynamic range across lines in the rendered image, which can result in image artifacts. For this reason, the start of the first exposure time of the line N plus one (e.g., line N+1) should be delayed by a certain amount of time after the start of the first exposure time of the previous line (e.g., line N). The start of the first exposure time of the line N plus one (e.g., line N+1) should be delayed because the readout for the previous line (e.g., line N) has not yet been completed, since the readout can only happen serially on the bus. There is only one MIPI (e.g., 820 of FIG. 8) connecting the camera sensor (e.g., sensor 810 of FIG. 8) to the SOC (e.g., including an ISP, such as an inline image processor 830 of FIG. 8) and, as such, the readout of the sensor data is completely serialized on the bus. As such, the readout of line N and plus one(e.g., line N+1) cannot happen until the previous line (e.g., line N) readout is complete.

Since the readout of line N and plus one (e.g., line N+1) cannot happen until the previous line (e.g., line N) readout is complete, there is an offset (e.g., delta 580) in the start of the exposure time for each line. The start of the exposure time of the second line delayed by an offset (e.g., a delta 580) from the start of the exposure time of the first line, and the start of the exposure time of the third line delayed by the offset from the start of the exposure time of the second line, and so one. As the whole image frame goes through the image processing procedure, as can be seen in the normal readout timing diagram 550, there is a big lag in time (e.g., time period 570*a*) between the start of the exposure the first line in the image frame versus start of the exposure time of the last line in the image frame. The larger the size of this lag in time, the more rolling shutter artifacts will be present in the rendered image.

For the FSR mode timing diagram 560, the lag in time (e.g., time period 570*b*), which is between the start of the exposure the first line in the image frame versus start of the exposure time of the last line in the image frame, is not a large as the lag in time (e.g. time period 570*a*), which is between the start of the exposure the first line in the image frame versus start of the exposure time of the last line in the image frame, for the normal mode timing diagram 550. The smaller this lag in time (e.g., time period 570*b*), the lower the number of rolling shutter artifacts in the rendered image.

However, although the FSR mode allows for a reduction in the number of rolling shutter artifacts, there is a cost associated with employing the FSR mode. Since the FSR mode performs a fast readout of the sensor data, the MIPI signal and clock rate will need to be increased to be able to accommodate the fast readout. Currently, not all sensors can support a FSR mode. Generally, only expensive camera sensors are able to support a FSR mode. However, most premium devices are currently moving towards being able to support a FSR mode in order to reduce the number of rolling shutter artifacts in the rendered images to provide for an improved IQ.

In FIG. 5, when comparing the normal readout timing diagram 550 to the FSR mode timing diagram 560, it is evident that each of the gaps (e.g., gap 540*b*) in the aggregated readout energy 530*b* for the FSR mode timing diagram 560 are larger than each of the gaps (e.g., gap 540*a*) in the aggregated readout energy 530*a* for the normal mode timing diagram 550. As such, the FSR mode can have larger vertical blanking periods (e.g., where one vertical blanking period is gap 540*b*) than the vertical blanking periods (e.g., where one vertical blanking period is gap 540*a*) for the normal mode.

As previously mentioned, the power consumption in for the FSR mode is lower than power consumption for the normal readout mode. The FSR mode can lead to a reduction in the required sensor power (e.g., in some cases, FSR mode can allow for a 160 to 260 milliwatt savings in sensor power in comparison to a normal readout mode). As such, utilizing the FSR mode for image processing, instead of the normal readout mode, can be beneficial from an IQ perspective as well as a sensor power perspective.

Figure 6:
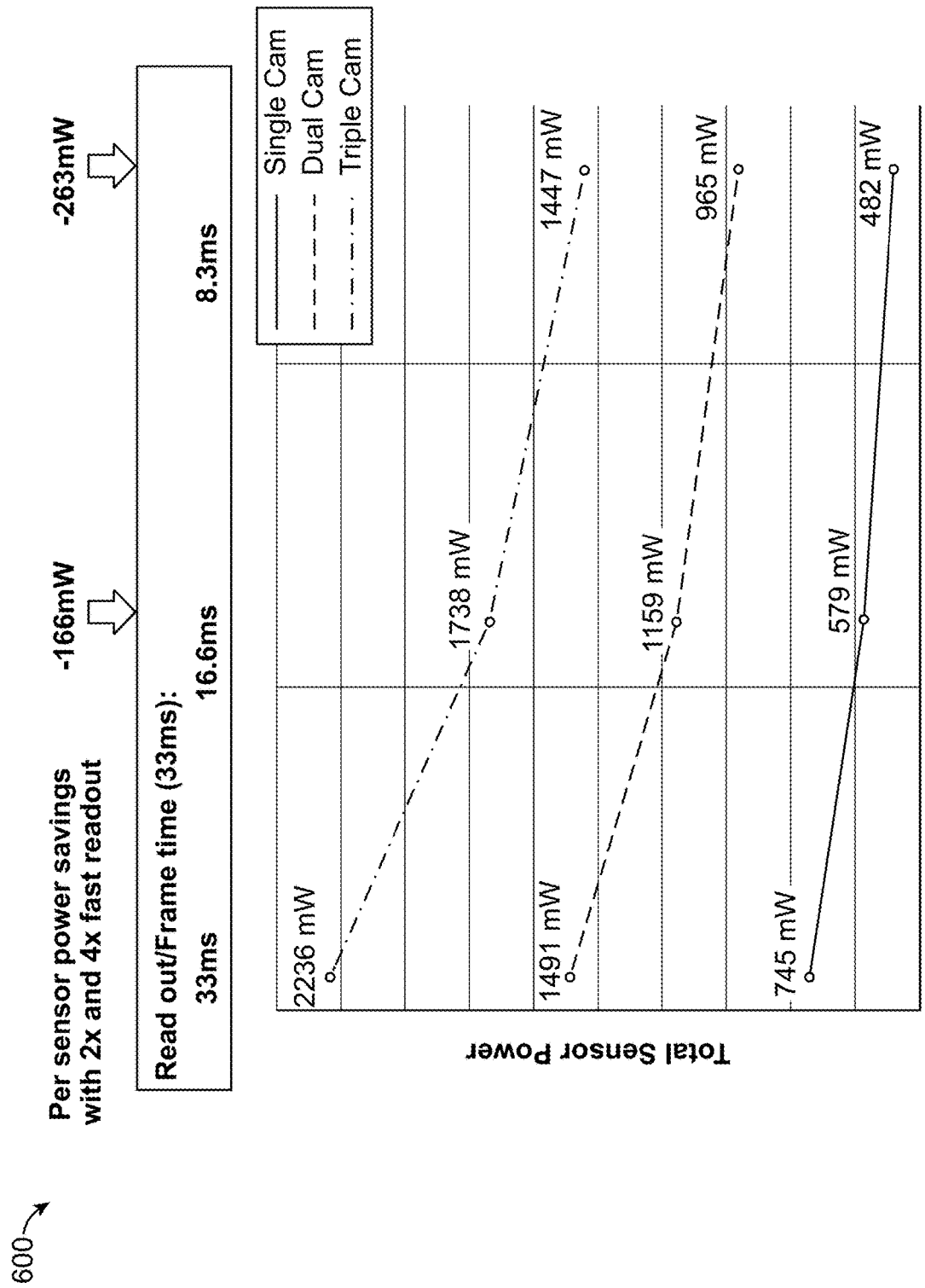
FIG. 6 is a graph showing an example power consumptions for a whole camera module, in accordance with some examples.

FIG. 6 shows the power advantage of employing the FSR mode. In particular, FIG. 6 is a graph 600 showing an example power consumptions for a whole camera module. On the graph 600, the x-axis denotes the readout per frame rate, and the y-axis denotes the total sensor power. The graph 600 shows typical power consumption curves for different readout per frame rates with different camera scenarios, including a single camera scenario, a dual camera scenario, and a triple camera scenario. For the slowest readout rate use case (e.g., with a readout per frame rate of 33 milliseconds), the power consumption is shown to be the highest for all three camera scenarios. As the readout rate is increased, for example to a readout per frame rate of 16.6 milliseconds and to a readout per frame rate of 8.3 milliseconds, the power consumption curves of the graph 600 show that the power consumption decreases dramatically.

Figure 7:
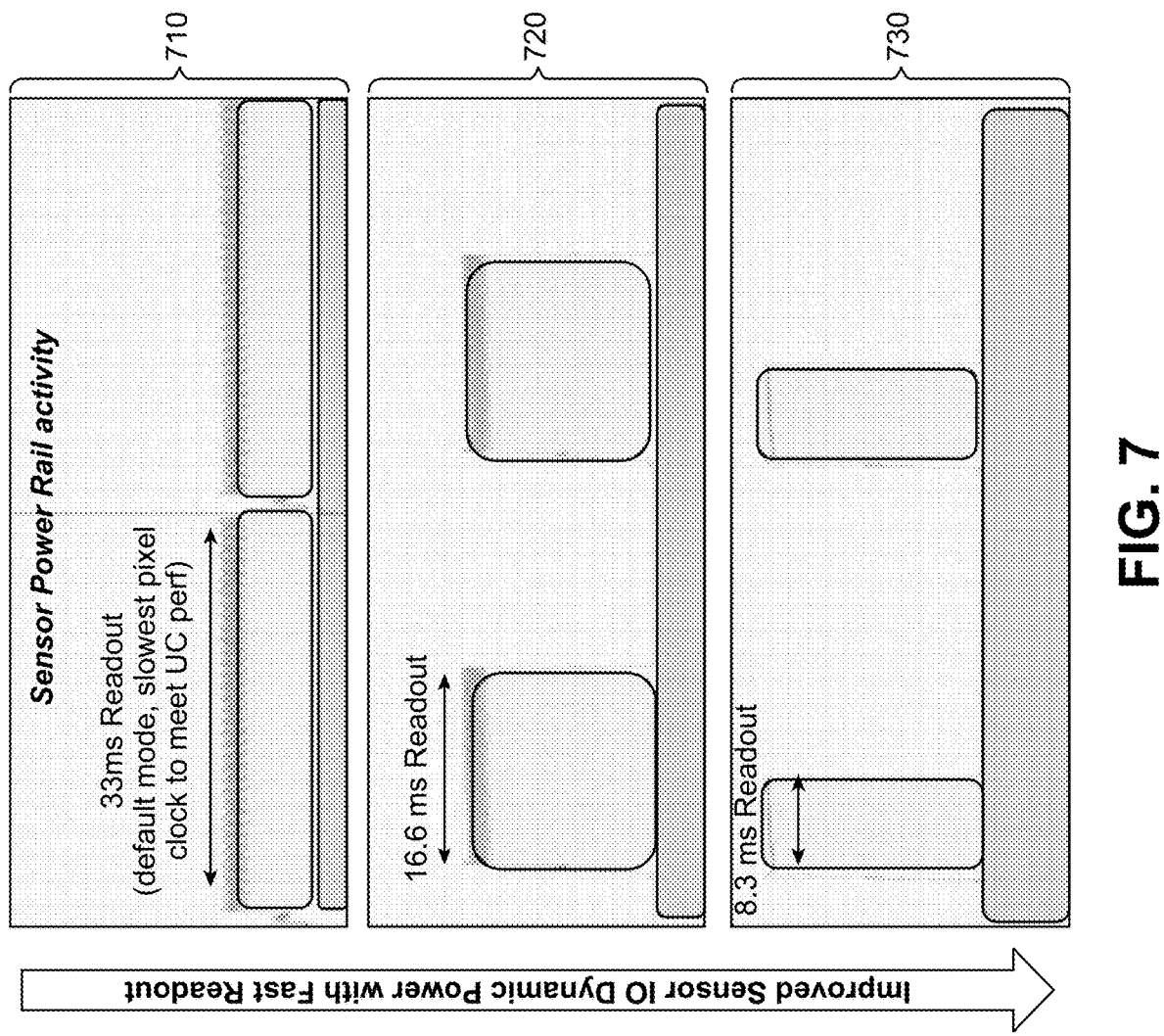
FIG. 7 are graphs each showing an example power consumption waveform captured at a mobile industry processor interface (MIPI) of a camera, in accordance with some examples.

FIG. 7 includes graphs 710, 720, 730 illustrating example power consumption for a MIPI of a camera. In particular, the graphs 710, 720, 730 each illustrate an example power consumption waveform captured at the MIPI of a camera. The graphs 710, 720, 730 each show a power consumption waveform captured at a MIPI for different readout per frame rates. For example, graph 710 shows a power consumption waveform captured at a MIPI for a readout per frame rate of 33 milliseconds, graph 720 shows a power consumption waveform captured at a MIPI for a readout per frame rate of 16.6 milliseconds, and graph 730 shows a power consumption waveform captured at a MIPI for a readout per frame rate of 8.3 milliseconds.

The graphs 710, 720, 730 show that the power consumption is significantly lower for the FSR mode (e.g., graph 730). Since FSR modes allows for a faster readout, camera components that are not utilized for the readout process are shut off during this large vertical blanking period (e.g., gap 540*b* of FIG. 5). Since these camera components are not using any power during this large vertical blanking period (e.g., gap 540*b* of FIG. 5), there can be a decrease in the amount of power consumption for the whole camera module.

Typically, camera sensors do not support any dynamic clock and voltage mechanisms. There is no voltage penalty on the sensor subsystem side, at least by increasing the clock rate of the system and finishing the readout of the sensor date much faster and, as such, it is desirable to operate in the FSR mode.

As previously mentioned, FSR mode can, however, impact power of the camera chipset (e.g., SOC), which can include the ISP. For example, the FSR mode can require the ISP to operate at a very high clock rate and voltage to finish the image frame processing during the condensed readout time of FSR mode. In addition, the FSR mode can require the memory (e.g., DDR memory) to run at a high clock rate to be able to receive the fast output of data from the image sensor processor.

Figure 8:
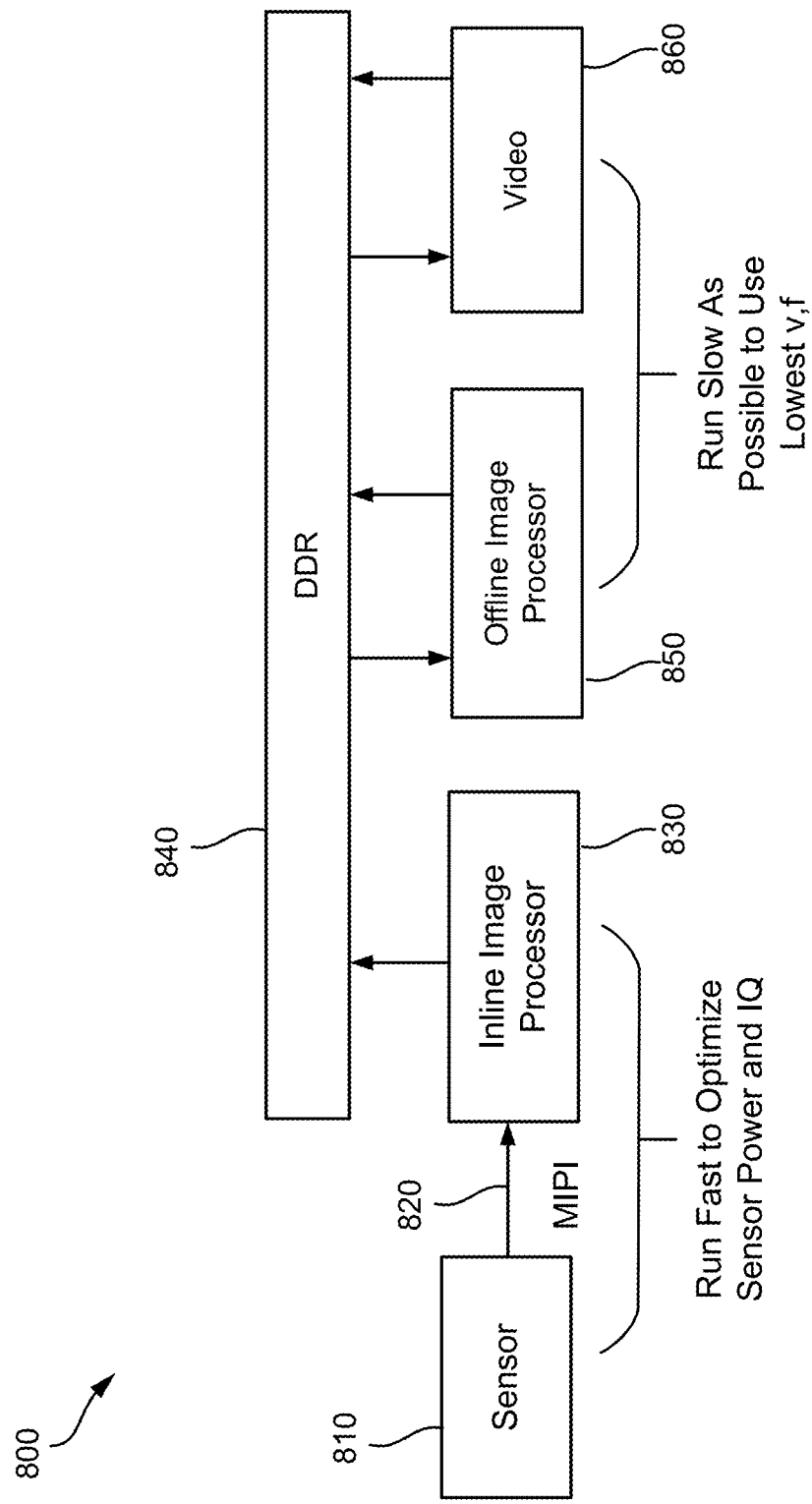
FIG. 8 is a diagram illustrating an example of a system for a camera showing the data flow, in accordance with some examples.

FIG. 8 shows data flow in a camera. In particular, FIG. 8 is a diagram illustrating an example of a system 800 for a camera showing the data flow. In FIG. 8, the system 800 is shown to include a sensor 810 (e.g., a camera sensor subsystem for obtaining image frames capturing scenes), an inline image processor 830, an offline image processor 850, and a video processor 860. The sensor 810, the inline image processor 830, the offline image processor 850, and the video processor 860 are all shown to be in communication with DDR memory 840.

During operation of the system 800, the sensor 810 can stream pixels of sensor data to the inline image processor 830 (e.g., an image front-end camera component, which can be a component in the SOC) via the MIPI 820. After the inline image processor 830 receives the pixels from the sensor 810, the inline image processor 830 can process the pixels one line at a time (e.g., as shown in FIG. 5). After the inline image processor 830 has processed all of the lines of the image frame, the inline image processor 830 can transfer the processed sensor date to the DDR memory 840. The processing by the inline image processor 830 is referred to as inline processing because the inline image processor 830 processes the pixels in line with the operation of the sensor 810 (e.g., FIG. 9 shows an example of inline processing).

The timing of the inline image processor 830 needs to be strictly maintained because the timeline of operation of the inline image processor 830 needs to correspond to (e.g., be inline with) the timeline of operation of the sensor 810. As such, if the sensor 810 readout occurs within 8.3 milliseconds, the operation of the inline image processor 830 needs to also be within 8.3 milliseconds to finish processing all of the pixels it receives from the sensor 810 to be completely inline.

In one or more examples, the output of the inline image processor 830 can be downscaled. For example, if the camera includes a forty-eight (48) megapixel camera sensor, all 48 megapixels of sensor data can streamed to the inline image processor 830. The offline image processor 850 would end up processing all this 48 megapixels, however the video resolution could itself be much less. For example, the resulting video can have a full high definition (FHD) video resolution or an ultra-high definition (UHD) video resolution. The output of inline image processor 830 can down-scaled, and then transferred to the DDR memory 840. The offline image processor 850 can operate on this downscale resolution and continue the rest of the image processing.

Figure 9:
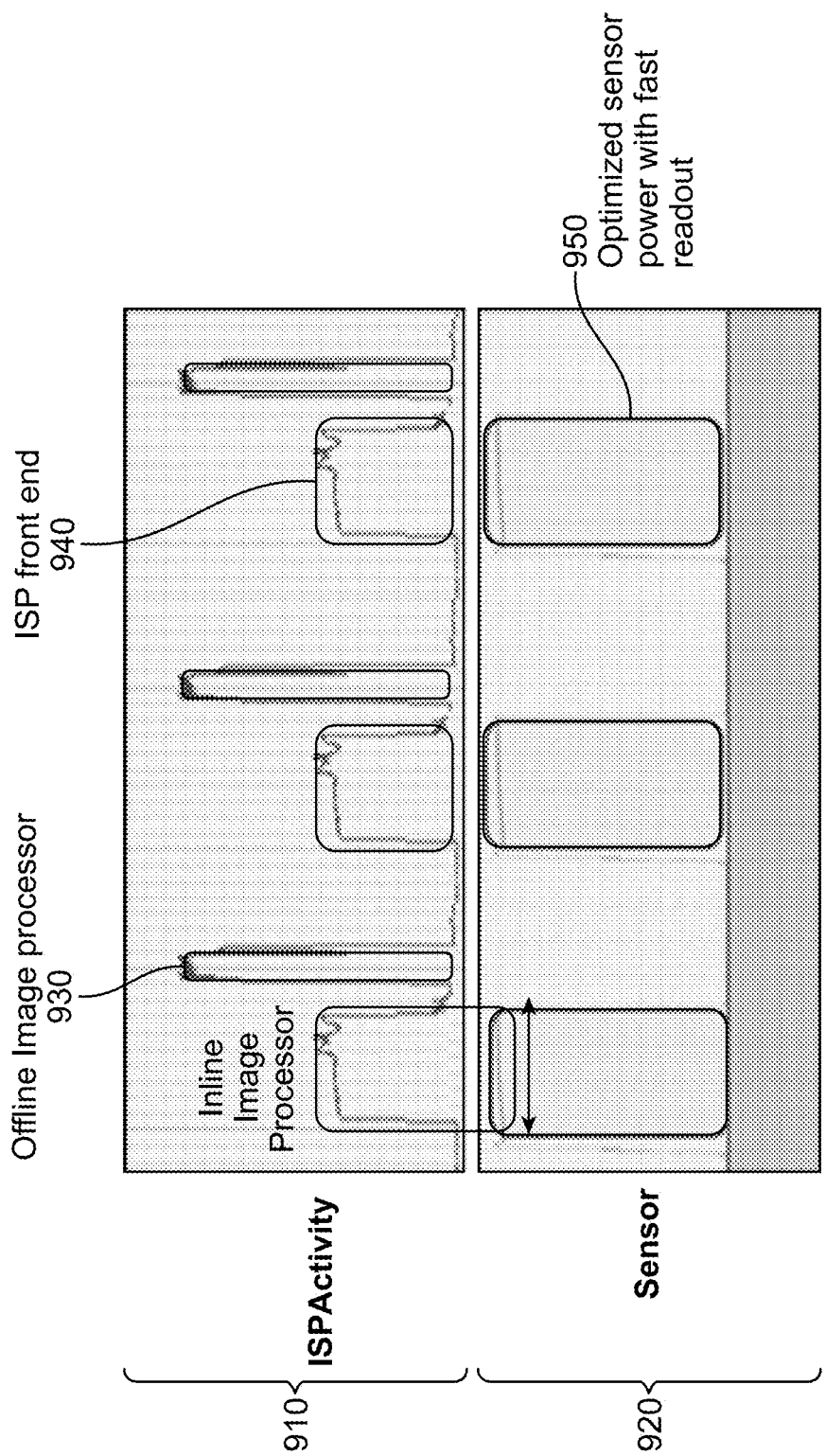
FIG. 9 are graphs each showing an example of a timeline of activity for image frames, in accordance with some examples.

FIG. 9 are graphs 910, 920 each showing an example of a timeline of activity for image frames. In FIG. 9, for graphs 910, 920, the x-axis denotes time, and the y-axis denotes activity. For graph 910, the ISP activity for three image frames is shown. The ISP activity includes activity by the inline image processor 830 (e.g., block 940 of graph 910) and the offline image processor 850 (e.g., activity block 930 of graph 910). For graph 920, the sensor activity (e.g., block 950), such as for sensor 810, for the same three image frames is shown.

In FIG. 9, the activity of the inline image processor 830 in graph 910 is shown to be inline with the sensor activity of graph 920. The ISP front end (e.g., inline image processor 830), which operates inline with the camera sensor (e.g., sensor 810), needs to run at a very high clock rate to support the FSR mode. Running the ISP front end at a very high clock rate can require a high power consumption, which can negatively impact the voltage of the shared rail power that supports other cores (e.g., camera components) of the SOC in addition to the ISP. Even though the sensor power consumption is reduced with the FSR mode, the SOC power consumption can be increased because of the high clock rate needed for the fast readout. As such, the SOC can have a power consumption penalty when the system is operating in the FSR mode.

The systems and techniques provide camera dynamic voting to optimize fast sensor mode power (e.g., FSR mode power). In one or more aspects, the systems and techniques provide a dynamic voting mechanism (e.g., dynamic clock voting engine 1250 of FIG. 12) that can optimize the camera chipset (e.g., the SOC) power consumption overhead incurred during operation of the camera in FSR mode.

Figure 10:
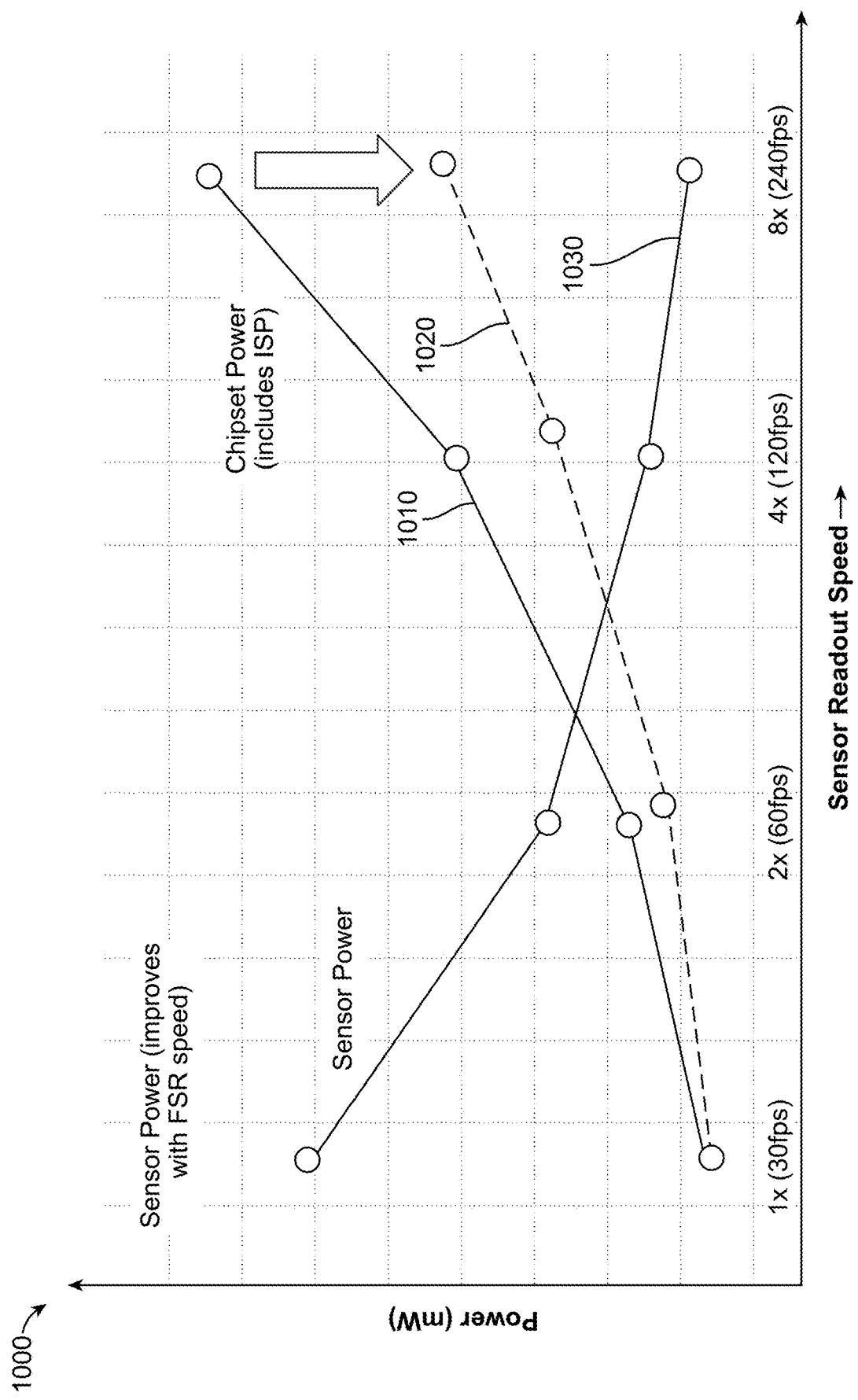
FIG. 10 is a graph showing an example power consumptions for chipset power of a camera and for a whole camera module, in accordance with some examples.

FIG. 10 is a graph 1000 showing example power consumptions for chipset power of a camera and for a camera module. For the graph 1000, the x-axis denotes sensor readout speed, and the y-axis denotes power in milliwatts. The graph 1000 shows a sensor power consumption curve 1030 for the camera sensor (e.g., sensor 810 of FIG. 8), a chipset power consumption curve 1010 for the SOC (e.g., which may include inline image processor 830 of FIG. 8) of the camera when not employing a dynamic voting mechanism, and a chipset power consumption curve 1020 for the SOC of the camera when employing the dynamic voting mechanism (e.g., dynamic clock voting engine 1250 of FIG. 12).

As shown in the sensor power consumption curve 1030 of FIG. 10, the sensor power consumption improves as the sensor readout speed increases (e.g. for operating a FSR mode). Conversely, the chipset power consumption curve 1010 shows that the chipset power consumption increases as the sensor readout speed increases (e.g., for operating a FSR mode). However, the chipset power consumption curve 1020, when compared with the chipset power consumption curve 1010, shows that the chipset power consumption is lessened when the dynamic voting mechanism is employed for a fast sensor readout (e.g., when operating the FSR mode) and, as such, the power consumption penalty for the chipset for operating at a faster readout speed is reduced.

In one or more aspects, to reduce the power consumption penalty for the chipset, the systems and techniques dynamically increase the ISP and DDR clock rate before the short sensor readout duration of the use case timeline, and lower the ISP and DDR clock rate immediately after the short sensor readout duration has completed (e.g., such that the clock rate is low during a large blanking interval, such as gap 540b of FIG. 5, in the use case timeline, where no sensor readout is being performed). In adjusting the clock rate as such, the large power overhead requirement can be limited to only the sensor readout portions of the use case timeline (e.g., which is typically only 25 to 50 percent of the use case timeline).

Most camera use cases operate at a specified image frame rate configured by high level application software. The systems and techniques can employ a configurable hardware timer mechanism (e.g., dynamic clock voting engine 1250 of FIG. 12) to trigger a dynamic increase in the clock rate and shared rail voltage immediately prior to receiving a new image frame from the image sensor, and a dynamic decrease in the clock rate and shared rail voltage right after processing of the image frame has been completed.

Figure 11:
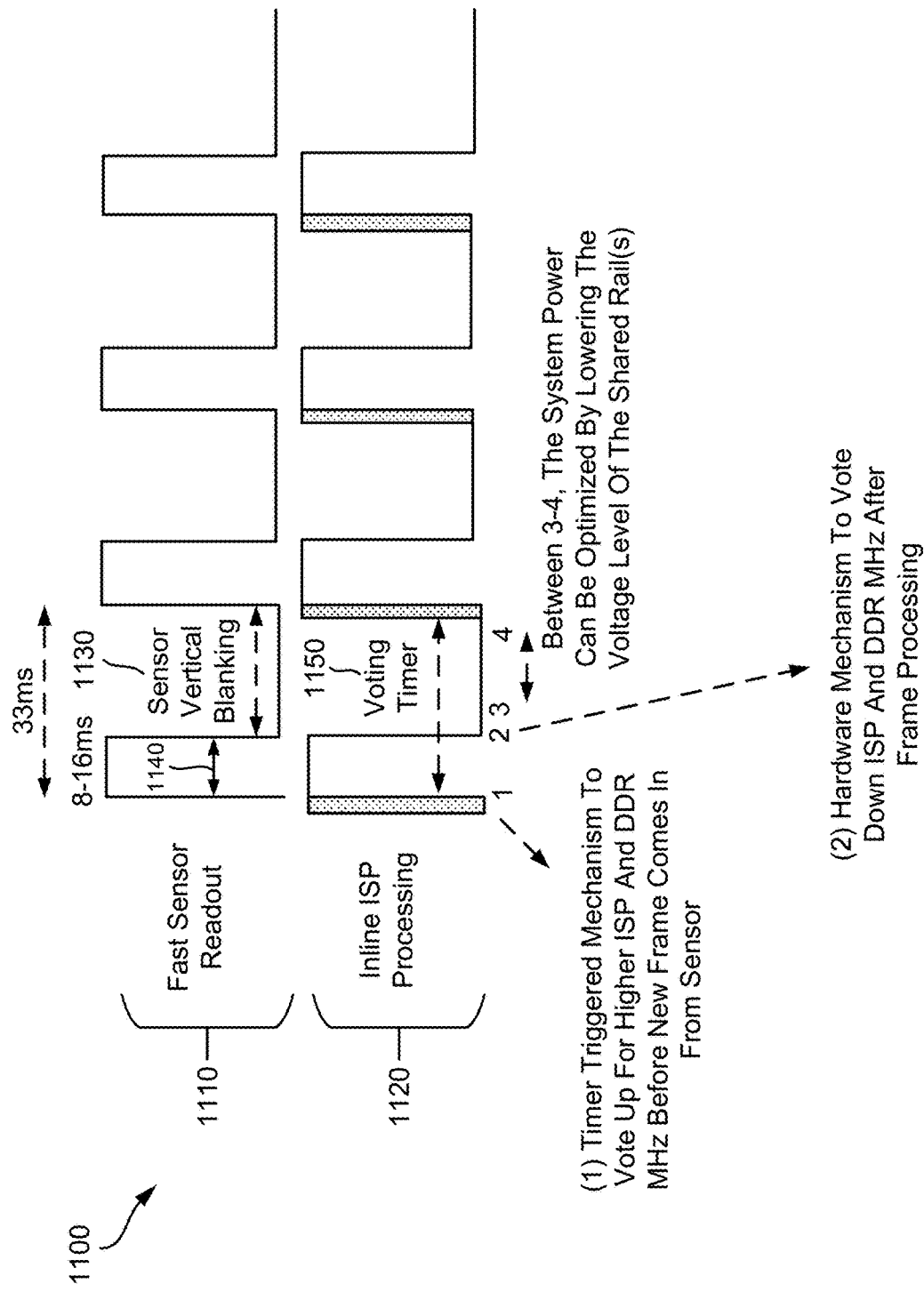
FIG. 11 is a diagram illustrating an example of timing for a camera employing a dynamic voting mechanism to optimize fast sensor mode power, in accordance with some examples.

FIG. 11 shows an example of a timing diagram for dynamically voting for an increase and decrease in the ISP and DDR clock rate and voltage. In particular, FIG. 11 is a diagram illustrating an example of timing 1100 for a camera employing a dynamic voting mechanism to optimize fast sensor mode power. In FIG. 11, fast sensor readout timing 1110 and inline ISP processing timing 1120 is shown. For FIG. 11, a dynamic voting mechanism (e.g., dynamic clock voting engine 1250) is employed that operates inline with the camera sensor (e.g., sensor 1210*a* through 1210*b* of FIG. 12). The dynamic voting mechanism can increase or decrease the ISP and DDR clock rate and associated rail voltage levels.

The timing 1100 of FIG. 11 shows activity for the FSR mode, which typically operates at a readout per frame rate of 33 milliseconds. The readout period 1140 (e.g., for approximately eight milliseconds), for the read out of the sensor data, is shown. Also shown is a large vertical blanking period 1130 (e.g., of approximately 24 milliseconds) that occur when the camera sensor is not streaming any pixels to the inline image processor.

When the readout period 1140 occurs, the dynamic voting mechanism can vote to increase the clock rate and increase the voltage for the rail powering the camera front end (e.g., including an inline image processor, such as inline image processor 830 of FIG. 8). Then, when the vertical blanking period 1130 occurs, the dynamic voting mechanism can vote to decrease the clock rate and decrease the voltage for the shared rail.

The dynamic voting mechanism can be implemented in software, hardware, or a combination of software and hardware. In some cases, the dynamic voting mechanism can be implemented as a hardware module, without the need for any application processor involvement. As such, any latencies to vote to increase or decrease the clock rate and power can be negligible. Since the latencies are minimized, the use case performance requirements can be met. In other cases, the application processor can be involved in the dynamic voting mechanism, such that the latencies of the timing shown in 1120 are met to save the power shown in 1020 of FIG. 10.

A timer mechanism (e.g., one or more timers 1260 of FIG. 12) can be built into the dynamic voting mechanism. Typically, the camera sensor operates at a certain frame rate, and the SOC has no knowledge of when the new pixels will come in from the camera sensor. The SOC (e.g., inline image processor) has to be prepared, even before the new pixels come in from the camera sensor. In order for the SOC to be prepared for the new set of pixels coming from the camera sensor, the timer mechanism can start a timer (e.g., voting timer 1150), which can be configured at the frame start, however set to expire at a slightly lower time than the frame time of the camera sensor. Configuring the timer expiry time to be slightly lower than the frame period allows the timer to fire ahead of the new frame readout start so that the SOC can be prepared to set up the higher clock and voltage required for the inline pixel processing. As soon as the SOC receives the first set of pixels of a new frame, (at point 1) the voting timer is set up for the next frame. After the inline processing has completed, (at point 2) the dynamic voting mechanism can quickly vote to decrease the clock rate and the voltage, without losing any time. The voting timer fires at 4 (before the next frame comes in from the sensor), so that the SOC can vote up to increase the clock rate ahead of the frame. The SOC power can be optimized by lowering the shared rail power (between points 3 and 4). As such, the dynamic voting mechanism (e.g., through voting for an increase and decrease in the clock rate and voltage) can allow for a reduction in the power penalty of the chipset (e.g., the SOC).

FIG. 12 is a diagram illustrating an example of system 1200 employing a dynamic voting mechanism (e.g., dynamic clock voting engine 1250) to optimize fast sensor mode power. In FIG. 12, the system 1200 is shown to include one or more sensors 1210*a* through 1210*b* (e.g., one or more sensors, such as camera or image sensors), ISPs 1230*a* through 1230*b* (e.g., one or more ISPs), memory 1240, a dynamic clock voting engine 1250, one or more timers 1260 (in some cases a plurality of timers), a system resource voting and aggregation engine 1270, and a clock and voltage control unit 1290 (e.g., a core/DDR clock control and power rail voltage control). The dynamic clock voting engine 1250, the system resource voting and aggregation engine 1270, and/or the clock and voltage control unit 1290 can be implemented in software, hardware, or a combination of software and hardware. Further, the additional sensors in system 1200 are optional, as indicated by the dashed outline of the box for sensor 1210*b*. For example, in some aspects, the system 1200 can include a single sensor 1210*a* (in which case the additional sensors, including sensor 1210*b*, are not included in or are not used by the system 1200). In other aspects, the system 1200 can include multiple sensors, including sensor 1210*a* through sensor 1210*b* (where "N" for "sensor(N)" in FIG. 12 is an integer greater than or equal to 2). Furthermore, in some aspects, the system 1200 can include a single ISP 1230*a* (in which case the additional ISPs, including ISP 1230*b*, are not included in or are not used by the system 1200). In other aspects, the system 1200 can include multiple ISPs, including ISP 1230*a* through ISP 1230*b* (where "N" for "ISP(N)" in FIG. 12 is an integer greater than or equal to 2).

In one or more examples, the sensors 1210*a* through 1210*b* may be RGB camera sensors. In some examples, each sensor 1210*a* through 1210*b* is associated with a respective camera, such as an RGB camera. The ISPs 1230*a* through 1230*b* may each include an inline image processor (e.g., inline image processor 830 of FIG. 8). Each ISP 1230*a* through 1230*b* can be associated with a respective sensor 1210*a* through 1210*b*. The memory 1240 may be DDR memory (e.g., DDR memory 840 of FIG. 8). Each of the timers 1260 can support a respective camera, and each is configured to trigger a vote up (increase) prior to a new image frame being streamed in from a sensor 1210*a* through 1210*b*. In some cases, multiple timers 1260 are included in the system 1200 to support multiple cameras.

During operation of the system 1200 of FIG. 12, the sensors 1210*a* through 1210*b* can obtain image frames by capturing scenes. At the start of the sensors 1210*a* through 1210*b* streaming pixels of the image frames to their associated ISPs 1230*a* through 1230*b*, the timers 1260 can start a timer (e.g., voting timer 1150), which can run at a slightly lower time period than the frame time of the camera sensor, to trigger the dynamic clock voting engine 1250 to vote up for an increase in the clock rate and rail voltage ahead of a frame. After the dynamic clock voting engine 1250 has been triggered to vote up, the dynamic clock voting engine 1250 can submit (e.g., transmit) an up vote to the system resource voting and aggregation engine 1270.

The system resource voting and aggregation engine 1270 can receive a plurality of votes 1280 from a plurality of components of the camera, which can include the dynamic clock voting engine 1250. The plurality of components of the camera can be within the camera SOC and can be powered by the same rail (or rails) or different rails. The plurality of votes 1280 can include the up vote from the dynamic clock voting engine 1250.

The system resource voting and aggregation engine 1270 (which can support multiple clients) receives the plurality of votes 1280, and maintains the current voting state of each of its clients and logic to vote up and down the client clocks and shared resources, such as DDR and voltage of power rails. When the system resource voting and aggregation engine 1270 determines that there is at least one client needing a higher operating clock and voltage of the shared rail, the system resource voting and aggregation engine 1270 can send a control signal to the clock and voltage control unit 1290 to increase the clock rate and/or increase the voltage on the shared rail or rails.

After the clock and voltage control unit 1290 receives the control signal to increase the clock rate and increase the voltage, the clock and voltage control unit 1290 can increase the voltage of the rail first and then the clock rate (e.g., to a higher Megahertz frequency). After the clock and voltage control unit 1290 has increased the clock rate (e.g., to a higher Megahertz frequency), this increased clock rate can be applied to ISPs 1230*a* through 1230*b* and the memory 1240.

After the clock rate of the ISPs 1230*a* through 1230*b* (e.g., one or more ISPs) and the memory 1240 has been increased, the sensors 1210*a* through 1210*b* (e.g., one or more sensors) can stream pixels of an image frame to their respective ISPs 1230*a* through 1230*b* via the ISP sensor interface 1220. After receiving the pixels of the image frames, the ISPs 1230*a* through 1230*b* can process (e.g., perform inline image processing of) the pixels. After the ISPs 1230*a* through 1230*b* have processed the pixels of the image frames, the ISPs 1230*a* through 1230*b* can transfer (e.g., transmit) the processed sensor data to memory 1240. Also, after the ISPs 1230*a* through 1230*b* have processed the pixels of the image frames, the dynamic clock voting engine 1250 can submit (e.g., transmit) a down vote (e.g., for a decrease in the clock rate and rail voltage) to the system resource voting and aggregation engine 1270.

The system resource voting and aggregation engine 1270 can receive another plurality of votes 1280 from the plurality of components of the camera, which can include the dynamic clock voting engine 1250. The plurality of votes 1280 can include the down vote from the dynamic clock voting engine 1250.

After the system resource voting and aggregation engine 1270 receives the plurality of votes 1280, if it determines that there is no more client needing the higher clock rate and voltage of the shared rail, then it can send a control signal to the clock and voltage control unit 1290 to decrease the clock rate and decrease the voltage on the shared rail or rails.

After the clock and voltage control unit 1290 receives the control signal to decrease the clock rate and decrease the voltage, the clock and voltage control unit 1290 can decrease the clock rate (e.g., to a higher Megahertz frequency) first and then can decrease the voltage on the rail or rails. After the clock and voltage control unit 1290 has decrease the clock rate (e.g., to a lower Megahertz frequency), this decreased clock rate can be applied to ISPs 1230*a* through 1230*b* and the memory 1240.

After a period of time (e.g., a vertical blanking period of time) has passed, the system 1200 will repeat the previously described operation according to the timing 1100 as shown on FIG. 11.

Figure 13:
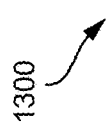
FIG. 13 is a table showing an example of power savings when employing dynamic voting to optimize fast sensor mode power, in accordance with some examples.

FIG. 13 is a table 1300 showing an example of power savings when employing dynamic voting to optimize fast sensor mode power. In FIG. 13, the table 1300 is shown to include four columns, which include a component listing 1310 (e.g., for a UHD30 camcorder), an operating parameters listing for a non-FSR mode use case 1320 (e.g., a normal readout mode), an operating parameters listing for a FSR mode without dynamic voting use case 1330, and an parameters listing for a FSR mode with dynamic voting use case 1340. As shown in the table 1300 of FIG. 13, the FSR mode with dynamic voting use case 1340 has a 12 percent (%) savings in power consumption as compared to the non-FSR mode use case 1320. The FSR mode without dynamic voting use case 1330 has only a 5.8% savings in power consumption as compared to the non-FSR mode use case 1320. As such, employing dynamic voting with the FSR mode can significantly reduce the chipset power penalty from operating in the FSR mode.

Figure 14:
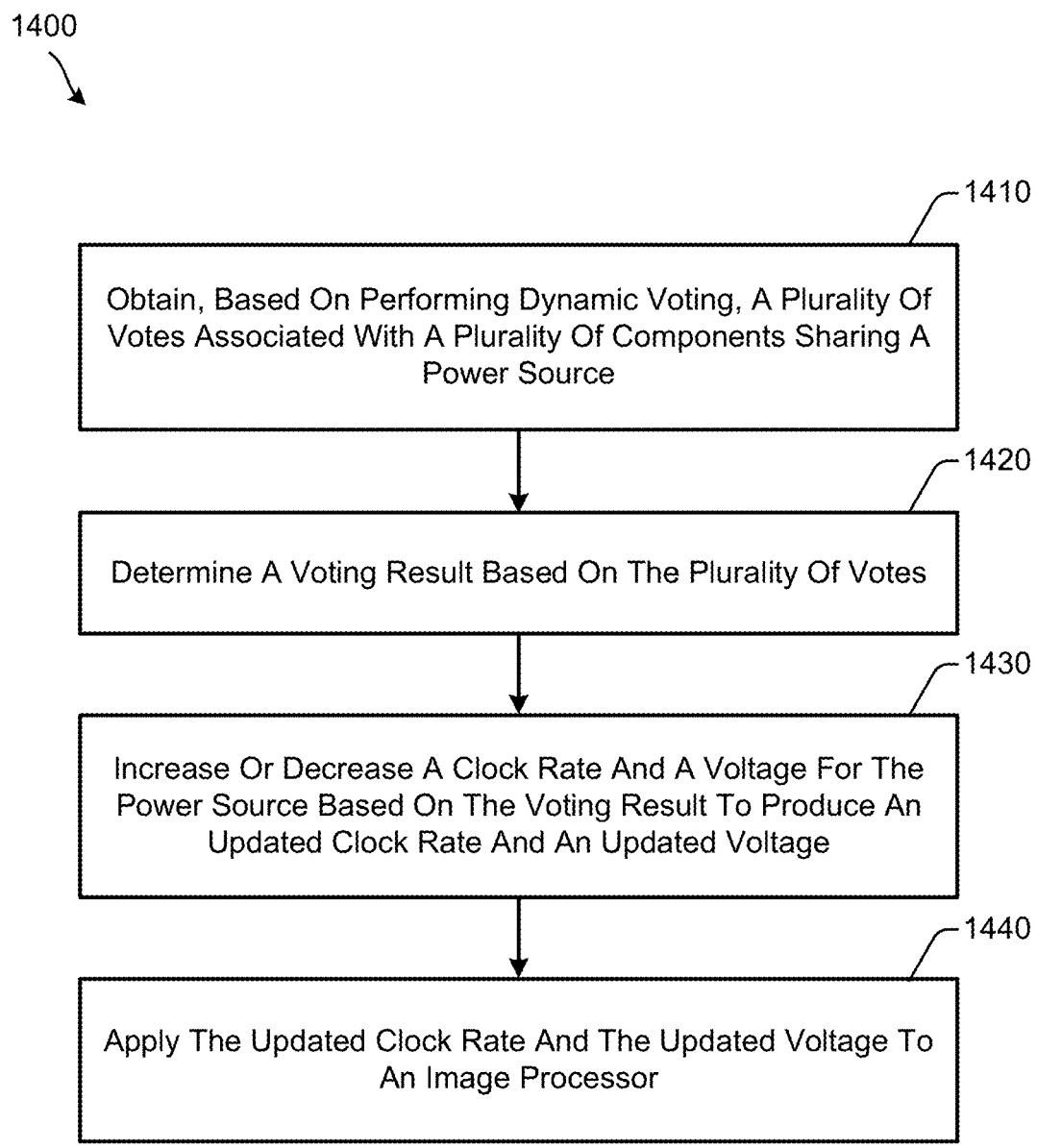
FIG. 14 is a flow diagram illustrating another example of a process for camera dynamic voting to optimize fast sensor mode power, in accordance with some examples.

FIG. 14 is a flow chart illustrating an example of a process 1400 for camera dynamic voting to optimize fast sensor mode power. The process 1400 can be performed by a computing device or system, or by a component or system (e.g., a chipset) of the computing device or system. In some aspects, the process 1400 can be performed by the system 1200 of FIG. 12, or by a computing device (e.g., a mobile device, camera device, extended reality (XR) device, laptop or desktop computer, a vehicle or computing device of the vehicle, etc.) that includes the system 1200. The operations of the process 1400 may be implemented as software components that are executed and run on one or more processors (e.g., one or more of the inline image processor 830 and/or the offline image processor 850 of FIG. 8, one or more of the ISPs 1230*a* to 1230*b* or other components of FIG. 12, the processor 1510 of FIG. 15, and/or other processor(s)).

At block 1410, the computing device or system (or component thereof) can obtain, based on performing dynamic voting, a plurality of votes associated with a plurality of components sharing a power source. The dynamic voting can be performed as described herein, such as described with respect to FIG. 12. For instance, in some aspects, to obtain the plurality of votes based on performing the dynamic voting, the computing device or system (or component thereof) can perform the dynamic voting to generate a vote (e.g., using the dynamic clock voting engine 1250) for at least one current image frame. The computing device or system (or component thereof) can obtain votes generated for at least one previous image frame and can aggregate (e.g., using the system resource voting and aggregation engine 1270) the vote and the votes to obtain the plurality of votes. In some cases, the computing device or system (or component thereof) can trigger the dynamic voting (e.g., based on a timer, such as the timer(s) 1260).

At block 1420, the computing device or system (or component thereof) can determine a voting result (e.g., using the dynamic clock voting engine 1250 and/or the system resource voting and aggregation engine 1270) based on the plurality of votes. In some cases, the power source shared by the plurality of components is or includes one or more power rails.

At block 1430, the computing device or system (or component thereof) can increase or decrease (e.g., using the clock and voltage control unit 1290) a clock rate and a voltage for the power source based on the voting result to produce an updated clock rate and an updated voltage.

At block 1440, the computing device or system (or component thereof) can apply the updated clock rate and the updated voltage to an image processor (e.g., the ISP 1230*a* or multiple ISPs, such as ISP 1230*a* through ISP 1230*b*). In some cases, the computing device or system (or component thereof) can include the image processor (e.g., the ISP 1230*a* or multiple ISPs, such as ISP 1230*a* through ISP 1230*b*). In some aspects, the image processor is a front-end component of a camera. In some cases, the image processor is an inline image processor. In some examples, the image processor is an image signal processor (ISP). In some cases, the image processor and the plurality of components are on a system on a chip (SOC).

In some cases, the computing device or system (or component thereof) can obtain, by a sensor (e.g., the sensor 1210*a* or from multiple sensors, such as sensor 1210*a* through 1210*b*), an image frame capturing a scene. In some cases, the computing device or system (or component thereof) can include the sensor (e.g., the sensor 1210*a* or multiple sensors, such as sensor 1210*a* through 1210*b*). In some aspects, the image processor operates inline in timing with the sensor, as described herein. In some cases, the computing device or system (or component thereof) can output (e.g., by the sensor) pixels of the image frame to the image processor (e.g., the sensor 1210*a* can output the pixels of the image frame to the respective ISP 1230*a* via the ISP sensor interface 1220, the sensors 1210*a* through 1210*b* can stream pixels of an image frame to their respective ISPs 1230*a* through 1230*b* via the ISP sensor interface 1220, etc.). The computing device or system (or component thereof) can process (e.g., using the image processor, such as the ISP 1230*a*) the image frame to produce processed image data. In some cases, the computing device or system (or component thereof) can process multiple image frames from sensors 1210*a* through 1210*b* using ISPs 1230*a* through 1230*b*. In some cases, the computing device or system (or component thereof) can transmit, output, or otherwise provide the processed image data to a memory (e.g., a double data rate (DDR) memory or other type of memory).

As noted above, the process 1400 may be performed by one or more computing devices or apparatuses. In some illustrative examples, the process 1400 can be performed by the image capture and processing system 100 of FIG. 1, the device 300 of FIG. 3, the system 1200 of FIG. 12, and/or one or more computing devices or systems (e.g., the computing system 1500 of FIG. 15). In some cases, such a computing device or apparatus may include a processor, microprocessor, microcomputer, or other component of a device that is configured to carry out the steps of the process 1400. In some examples, such computing device or apparatus may include one or more sensors configured to capture image data. For example, the computing device can include a smartphone, a head-mounted display, a mobile device, a camera, a tablet computer, or other suitable device. In some examples, such computing device or apparatus may include a camera configured to capture one or more images or videos. In some cases, such computing device may include a display for displaying images. In some examples, the one or more sensors and/or camera are separate from the computing device, in which case the computing device receives the sensed data. Such computing device may further include a network interface configured to communicate data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 1400 is illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1400 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 15:
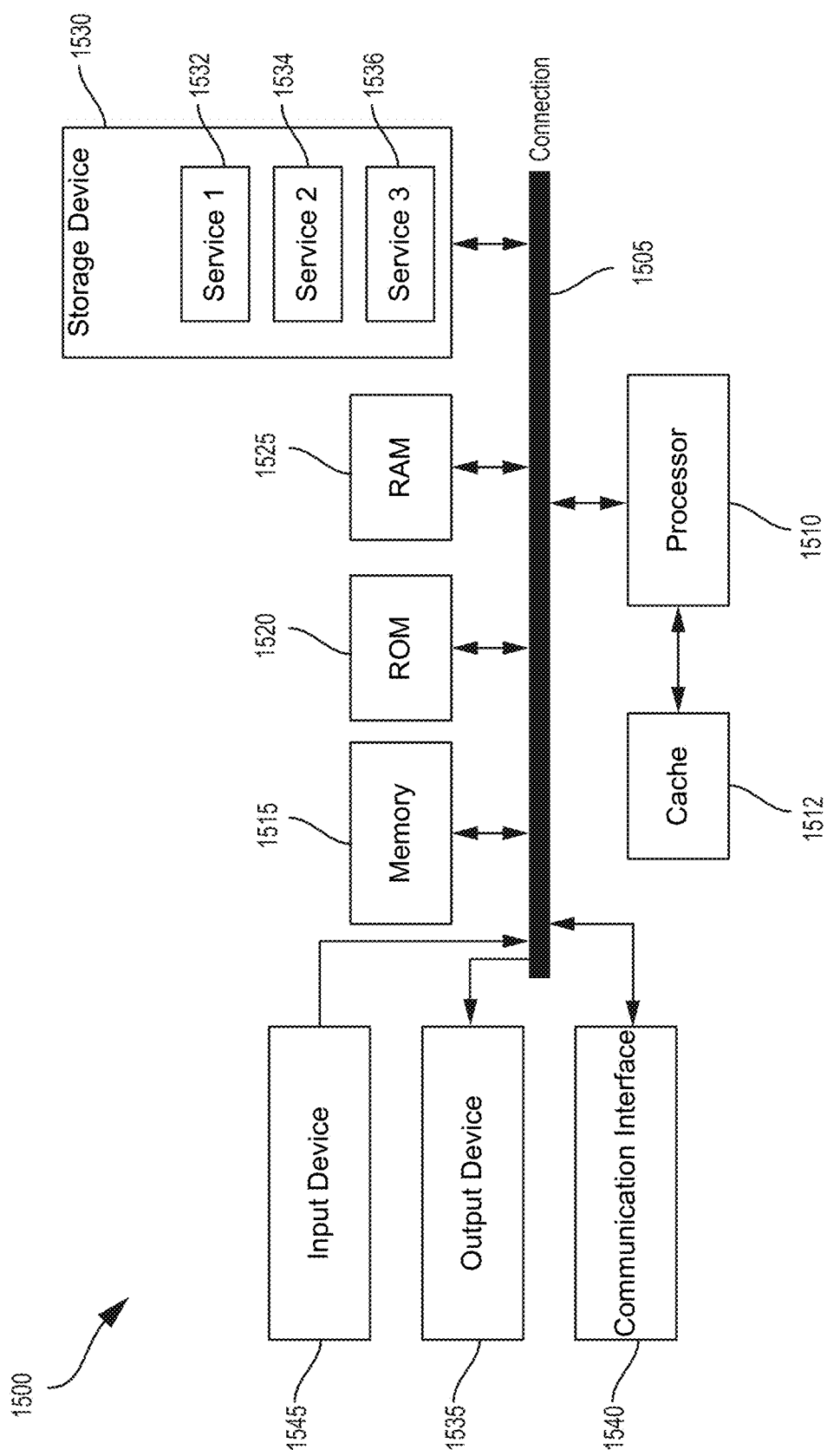
FIG. 15 is a diagram illustrating an example of a system for implementing certain aspects described herein.

FIG. 15 is a diagram illustrating an example of a system for implementing certain aspects of the present technology. In particular, FIG. 15 illustrates an example of computing system 1500, which can be for example any computing device making up internal computing system, a remote computing system, a camera, or any component thereof in which the components of the system are in communication with each other using connection 1505. Connection 1505 can be a physical connection using a bus, or a direct connection into processor 1510, such as in a chipset architecture. Connection 1505 can also be a virtual connection, networked connection, or logical connection.

In some embodiments, computing system 1500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1500 includes at least one processing unit (CPU or processor) 1510 and connection 1505 that couples various system components including the memory unit 1515, such as read-only memory (ROM) 1520 and random access memory (RAM) 1525 to processor 1510.

Computing system 1500 can include a cache 1512 of high-speed memory connected directly with, in close proximity to, or integrated as part of processor 1510.

Processor 1510 can include any general purpose processor and a hardware service or software service, such as services 1532, 1534, and 1536 stored in storage device 1530, configured to control processor 1510 as well as a special-purpose processor where software instructions are incorporated into the actual processor design. Processor 1510 may essentially be a completely self-contained computing system, containing multiple cores or processors, a bus, memory controller, cache, etc. A multi-core processor may be symmetric or asymmetric.

To enable user interaction, computing system 1500 includes an input device 1545, which can represent any number of input mechanisms, such as a microphone for speech, a touch-sensitive screen for gesture or graphical input, keyboard, mouse, motion input, speech, etc. Computing system 1500 can also include output device 1535, which can be one or more of a number of output mechanisms. In some instances, multimodal systems can enable a user to provide multiple types of input/output to communicate with computing system 1500. Computing system 1500 can include communications interface 1540, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1540 may also include one or more Global Navigation Satellite System (GNSS) receivers or transceivers that are used to determine a location of the computing system 1500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1530 can include software services, servers, services, etc., that when the code that defines such software is executed by the processor 1510, it causes the system to perform a function. In some embodiments, a hardware service that performs a particular function can include the software component stored in a computer-readable medium in connection with the necessary hardware components, such as processor 1510, connection 1505, output device 1535, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined system or component (e.g., a system-on-chip).

Illustrative aspects of the disclosure include:

Aspect 1. A method for processing image data, the method comprising: obtaining, based on performing dynamic voting, a plurality of votes associated with a plurality of components sharing a power source; determining a voting result based on the plurality of votes; increasing or decreasing a clock rate and a voltage for the power source based on the voting result to produce an updated clock rate and an updated voltage; and applying the updated clock rate and the updated voltage to an image processor.

Aspect 2. The method of Aspect 1, wherein obtaining, based on performing dynamic voting, the plurality of votes comprises: performing the dynamic voting to generate a vote for at least one current image frame; obtaining votes generated for at least one previous image frame; and aggregating the vote and the votes to obtain the plurality of votes.

Aspect 3. The method of any one of Aspects 1 or 2, further comprising triggering the dynamic voting.

Aspect 4. The method of Aspect 3, wherein triggering of the dynamic voting is based on a timer.

Aspect 5. The method of any one of Aspects 1 to 4, further comprising obtaining, by a sensor, an image frame capturing a scene.

Aspect 6. The method of Aspect 5, wherein the image processor operates inline in timing with the sensor.

Aspect 7. The method of any one of Aspects 5 or 6, further comprising outputting, by the sensor, pixels of the image frame to the image processor.

Aspect 8. The method of any one of Aspects 5 to 7, further comprising processing, by the image processor, the image frame to produce processed image data.

Aspect 9. The method of Aspect 8, further comprising transmitting the processed image data to memory.

Aspect 10. The method of Aspect 9, wherein the memory is double data rate (DDR) memory.

Aspect 11. The method of any one of Aspects 1 to 10, wherein the image processor is a front-end component of a camera.

Aspect 12. The method of any one of Aspects 1 to 11, wherein the image processor is an inline image processor.

Aspect 13. The method of any one of Aspects 1 to 12, wherein the image processor is an image signal processor (ISP).

Aspect 14. The method of any one of Aspects 1 to 13, wherein the image processor and the plurality of components are on a system on a chip (SOC).

Aspect 15. The method of any one of Aspects 1 to 14, wherein the power source shared by the plurality of components is one or more power rails.

Aspect 16. An apparatus for processing image data, the apparatus comprising: at least one memory; and at least one processor coupled to the at least one memory and configured to: obtain, based on performing dynamic voting, a plurality of votes associated with a plurality of components sharing a power source; determine a voting result based on the plurality of votes; increase or decreasing a clock rate and a voltage for the power source based on the voting result to produce an updated clock rate and an updated voltage; and apply the updated clock rate and the updated voltage to an image processor.

Aspect 17. The apparatus of Aspect 16, wherein, to obtain the plurality of votes based on performing the dynamic voting, the at least one processor is configured to: perform the dynamic voting to generate a vote for at least one current image frame; obtain votes generated for at least one previous image frame; and aggregate the vote and the votes to obtain the plurality of votes.

Aspect 18. The apparatus of any one of Aspects 16 or 17, wherein the at least one processor is configured to trigger the dynamic voting.

Aspect 19. The apparatus of any one of Aspects 16 to 18, wherein the at least one processor is configured to trigger the dynamic voting based on a timer.

Aspect 20. The apparatus of any one of Aspects 16 to 19, further comprising: a sensor configured to capture an image frame of a scene.

Aspect 21. The apparatus of Aspect 20, wherein the sensor is configured to output pixels of the image frame to the image processor.

Aspect 22. The apparatus of any one of Aspects 20 or 21, further comprising the image processor, wherein the image processor operates inline in timing with the sensor.

Aspect 23. The apparatus of any one of Aspects 20 to 22, wherein the image processor is configured to process the image frame to produce processed image data.

Aspect 24. The apparatus of Aspect 23, wherein the at least one processor is configured to transmit the processed image data to the at least one memory.

Aspect 25. The apparatus of Aspect 24, wherein the at least one memory is double data rate (DDR) memory.

Aspect 26. The apparatus of any one of Aspects 16 to 25, wherein the image processor is a front-end component of a camera.

Aspect 27. The apparatus of any one of Aspects 16 to 26, wherein the image processor is an inline image processor.

Aspect 28. The apparatus of any one of Aspects 16 to 27, wherein the image processor is an image signal processor (ISP).

Aspect 29. The apparatus of any one of Aspects 16 to 28, wherein the image processor and the plurality of components are on a system on a chip (SOC).

Aspect 30. The apparatus of any one of Aspects 16 to 29, wherein the power source shared by the plurality of components is one or more power rails.

Aspect 31. A non-transitory computer-readable medium having stored thereon instructions that, when executed by at least one processor, cause the at least one processor to perform operations according to any of Aspects 1 to 15.

Aspect 32. An apparatus for processing image data, comprising one or more means for performing operations according to any of Aspects 1 to 15.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

What is claimed is:

1. A method for processing image data, the method comprising:
   detecting a start of a readout period of an image sensor;
   obtaining, based on the detected start of the readout period of the image sensor, a first plurality of votes associated with a plurality of components sharing a power source;
   increasing a clock rate and a voltage for the power source based on the first plurality of votes to produce an updated clock rate and an updated voltage for an image processor; and
   applying the updated clock rate and the updated voltage to the image processor for processing frame data output during the readout period of the image sensor.

2. The method of claim 1, wherein obtaining the first plurality of votes comprises:
   generating a vote for at least one current image frame;
   obtaining votes generated for at least one previous image frame; and
   aggregating the vote and the votes to obtain the first plurality of votes.

3. The method of claim 1, further comprising obtaining the first plurality of votes based on a timer.

4. The method of claim 1, further comprising obtaining, by the image sensor, an image frame capturing a scene.

5. The method of claim 4, wherein the image processor operates inline in timing with the image sensor.

6. The method of claim 1, further comprising processing, by the image processor, the frame data to produce processed image data.

7. The method of claim 6, further comprising outputting the processed image data to memory.

8. The method of claim 7, wherein the memory is double data rate (DDR) memory.

9. The method of claim 1, wherein the image processor is a front-end component of a camera.

10. The method of claim 1, wherein the image processor is an inline image processor.

11. The method of claim 1, wherein the image processor is an image signal processor (ISP).

12. The method of claim 1, wherein the image processor and the plurality of components are on a system on a chip (SOC).

13. The method of claim 1, wherein the power source shared by the plurality of components is one or more power rails.

14. The method of claim 1, further comprising:
   applying, based on an end of processing of the frame data by the image processor, a reduced clock rate and a reduced voltage to the image processor for operation during a blanking interval of the image sensor.

15. The method of claim 1, further comprising:
   obtaining, based on an end of processing of the frame data by the image processor, a second plurality of votes associated with the plurality of components sharing a power source;
   decreasing the clock rate and the voltage for the power source based on the second plurality of votes to produce a further updated clock rate and a further updated voltage for the image processor; and
   applying the further updated clock rate and the further updated voltage to the image processor for operation during a blanking interval of the image sensor.

16. An apparatus for processing image data, the apparatus comprising:
   at least one memory; and
   at least one processor coupled to the at least one memory and configured to:
      detect a start of a readout period of an image sensor;
      obtain, based on the detected start of the readout period of the image sensor, a first plurality of votes associated with a plurality of components sharing a power source;
      increase a clock rate and a voltage for the power source based on the first plurality of votes to produce an updated clock rate and an updated voltage for an image processor; and
      apply the updated clock rate and the updated voltage to the image processor for processing frame data output during the readout period of the image sensor.

17. The apparatus of claim 16, wherein, to obtain the first plurality of votes, the at least one processor is configured to:
   generate a vote for at least one current image frame;
   obtain votes generated for at least one previous image frame; and
   aggregate the vote and the votes to obtain the first plurality of votes.

18. The apparatus of claim 16, wherein the at least one processor is configured to obtain the first plurality of votes based on a timer.

19. The apparatus of claim 16, further comprising the image sensor.

20. The apparatus of claim 19, further comprising the image processor, wherein the image processor operates inline in timing with the image sensor.

21. The apparatus of claim 16, wherein the image processor is configured to process the frame data to produce processed image data.

22. The apparatus of claim 21, wherein the at least one processor is configured to output the processed image data to the at least one memory.

23. The apparatus of claim 22, wherein the at least one memory is double data rate (DDR) memory.

24. The apparatus of claim 16, wherein the image processor is a front-end component of a camera.

25. The apparatus of claim 16, wherein the image processor is an inline image processor.

26. The apparatus of claim 16, wherein the image processor is an image signal processor (ISP).

27. The apparatus of claim 16, wherein the image processor and the plurality of components are on a system on a chip (SOC).

28. The apparatus of claim 16, wherein the power source shared by the plurality of components is one or more power rails.

29. The apparatus of claim 16, wherein the at least one processor is configured to:

apply, based on an end of processing of the frame data by the image processor, a reduced clock rate and a reduced voltage to the image processor for operation during a blanking interval of the image sensor.

30. The apparatus of claim 16, wherein the at least one processor is configured to:

obtain, based on an end of processing of the frame data by the image processor, a second plurality of votes associated with the plurality of components sharing a power source;

decrease the clock rate and the voltage for the power source based on the second plurality of votes to produce a further updated clock rate and a further updated voltage for the image processor; and apply the further updated clock rate and the further updated voltage to the image processor for operation during a blanking interval of the image sensor.

* * * * *